(12) United States Patent
Hsiao et al.

(10) Patent No.: US 11,959,230 B2
(45) Date of Patent: Apr. 16, 2024

(54) MOLDING SYSTEM

(71) Applicant: Fu-Lin HSIAO, New Taipei (TW)

(72) Inventors: Fu-Lin Hsiao, New Taipei (TW); Yang-Han Lee, Taoyuan (TW)

(73) Assignee: Fu-Lin Hsiao, New Taipei (TW)

( * ) Notice: Subject to any disclaimer, the term of this patent is extended or adjusted under 35 U.S.C. 154(b) by 304 days.

(21) Appl. No.: 17/679,248

(22) Filed: Feb. 24, 2022

(65) Prior Publication Data

US 2022/0275586 A1 Sep. 1, 2022

(30) Foreign Application Priority Data

Feb. 26, 2021 (TW) .................................. 110107067

(51) Int. Cl.
*D21J 3/00* (2006.01)
*B65G 47/14* (2006.01)
*D21J 5/00* (2006.01)

(52) U.S. Cl.
CPC ............ *D21J 3/00* (2013.01); *B65G 47/1485* (2013.01); *D21J 5/00* (2013.01)

(58) Field of Classification Search
CPC ....... D21J 3/00; D21J 5/00; D21J 3/10; B65G 47/1485; B65G 47/252; B65G 57/165; D21D 5/28; D21F 1/66
See application file for complete search history.

(56) References Cited

U.S. PATENT DOCUMENTS

| 11,828,023 | B2* | 11/2023 | Hsiao | ......................... | D21J 3/00 |
| 2022/0275586 | A1* | 9/2022 | Hsiao | ......................... | D21J 3/00 |
| 2023/0148434 | A1* | 5/2023 | Hsiao | ......................... | D21J 3/00 |
| | | | | | 162/216 |

FOREIGN PATENT DOCUMENTS

| DE | 202023105782 U1 * | 12/2023 | ................ | D21J 3/10 |
| TW | M603476 U | 11/2020 | | |
| TW | 202233943 A * | 9/2022 | ......... | B65G 47/1485 |

\* cited by examiner

*Primary Examiner* — Jose A Fortuna
(74) *Attorney, Agent, or Firm* — Michael Best & Friedrich LLP

(57) ABSTRACT

A molding system includes a frame device, a scooping device, a demolding device, a cutting device, an inspection device, a packaging device, and a conveying device. The frame device defines a scooping zone, a hot pressing zone, a cutting zone, an inspection zone, and a packaging zone. The scooping device includes a pulp tank that is adapted to contain a slurry, and a scooping mold that is adapted to scoop the slurry such that the slurry forms a blank unit thereon. The cutting device is adapted to cut the blank unit into a plurality of blank bodies. The conveying device is adapted to convey the blank bodies from the cutting zone to the packaging zone through the inspection zone.

29 Claims, 18 Drawing Sheets

MOLDING SYSTEM

CROSS-REFERENCE TO RELATED APPLICATION

This application claims priority to Taiwanese Invention Patent Application No. 110107067, filed on Feb. 26, 2021.

FIELD

The disclosure relates to a pulp processing machine, and more particularly to a molding system.

BACKGROUND

A common pulp molding process for making paper products, such as paper stands, paper cups and paper bowls, requires several machines that respectively perform different functions sequentially (e.g., scooping, hot pressing, and cutting), and then requires manpower to inspect, to stack and to package the paper products. Because transfer of the blanks from one machine to another also relies on manpower, the whole pulp molding process is time-consuming and is not cost-effective.

To save time and manpower, machines that can perform more than one function have been developed, an example being a conventional wet-fiber paper molding machine disclosed in Taiwanese Utility Model Patent No. M603476. The conventional wet-fiber paper molding machine is a multi-functional machine that integrates scooping, hot pressing, and cutting functions. However, because the conventional wet-fiber paper molding machine cannot conduct product inspection or perform packaging, further improvement is necessary.

Moreover, referring to FIG. 1, a conventional hot pressing mold unit 1 includes a lower mold 11 that is operable to generate heat, and an upper mold 12. The upper mold 12 is operable to generate an airflow to suck a semi-finished paper product 10 and then is operable to be separably coupled to the upper mold 11. When the upper mold 12 and the lower mold 11 are coupled to each other, the heat generated by the lower mold 11 removes water and/or moisture from the semi-finished paper product 10 to shape the semi-finished paper product 10. After the semi-finished paper product 10 is dried and shaped, the upper mold 12 is separated from the lower mold 11. Next, the upper mold 12 generates another airflow to blow the dried semi-finished paper product 10 away so that the dried semi-finished paper product 10 is demolded from the upper mold 12.

However, some parts of the semi-finished paper product 10 may stick to the upper mold 12 before the semi-finished paper product 10 is completely dried, which skews the semi-finished paper product 10 when the upper mold 12 blows the semi-finished paper product 10 via the airflow. Consequently, the semi-finished paper product 10 is stuck at the upper mold 12. At this time, if the airflow that blows the semi-finished paper product 10 is not strong enough, the semi-finished paper product 10 cannot be demolded from the upper mold 12. If the airflow is too strong, it may make holes in the semi-finished paper product 10. Both will cause a high defect rate, and troubles in the pulp molding process.

SUMMARY

Therefore, an object of the disclosure is to provide a molding system that can alleviate at least one of the drawbacks of the prior arts.

According to the disclosure, the molding system is adapted for use with a slurry. The molding system includes a frame device, a scooping device, a demolding device, a cutting device, an inspection device, a packaging device, and a conveying device. The frame device defines a scooping zone, a hot pressing zone, a cutting zone, an inspection zone, and a packaging zone. The scooping device is disposed at the scooping zone and includes a pulp tank that is adapted to contain the slurry, and a scooping mold that is adapted to scoop the slurry such that the slurry forms a blank unit thereon. The demolding device includes a first mold, a hot pressing mold and a second mold. The first mold is operable to move back and forth between the scooping zone and the hot pressing zone. The hot pressing mold is disposed at the hot pressing zone. The second mold is disposed at a boundary between the hot pressing zone and the cutting zone. The first mold is adapted to suck the blank unit so that the blank unit is demolded from the scooping mold, is adapted to convey the blank unit from the scooping mold to the hot pressing mold such that the blank unit is heated and compressed between the first mold and the hot pressing mold to form in a shape of the first mold, and is adapted to convey the blank unit from the hot pressing mold to the second mold. One of the first mold and the second mold is operable to move relative to the other one of the first mold and the second mold. When the one of the first mold and the second mold moves away from the other one of the first mold and the second mold, the first mold is operable to generate an airflow to push the blank unit away and the second mold is adapted to suck the blank unit so that the blank unit is demolded from the first mold. The cutting device is disposed at the cutting zone and is adapted to cut the blank unit into a plurality of blank bodies. The inspection device is disposed at the inspection zone and is adapted to inspect each of the blank bodies so as to generate at least one inspection datum accordingly. The packaging device is disposed at the packaging zone and is adapted to wrap the blank bodies in a packaging bag. The conveying device is disposed at the frame device and is adapted to convey the blank bodies from the cutting zone to the packaging zone through the inspection zone.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
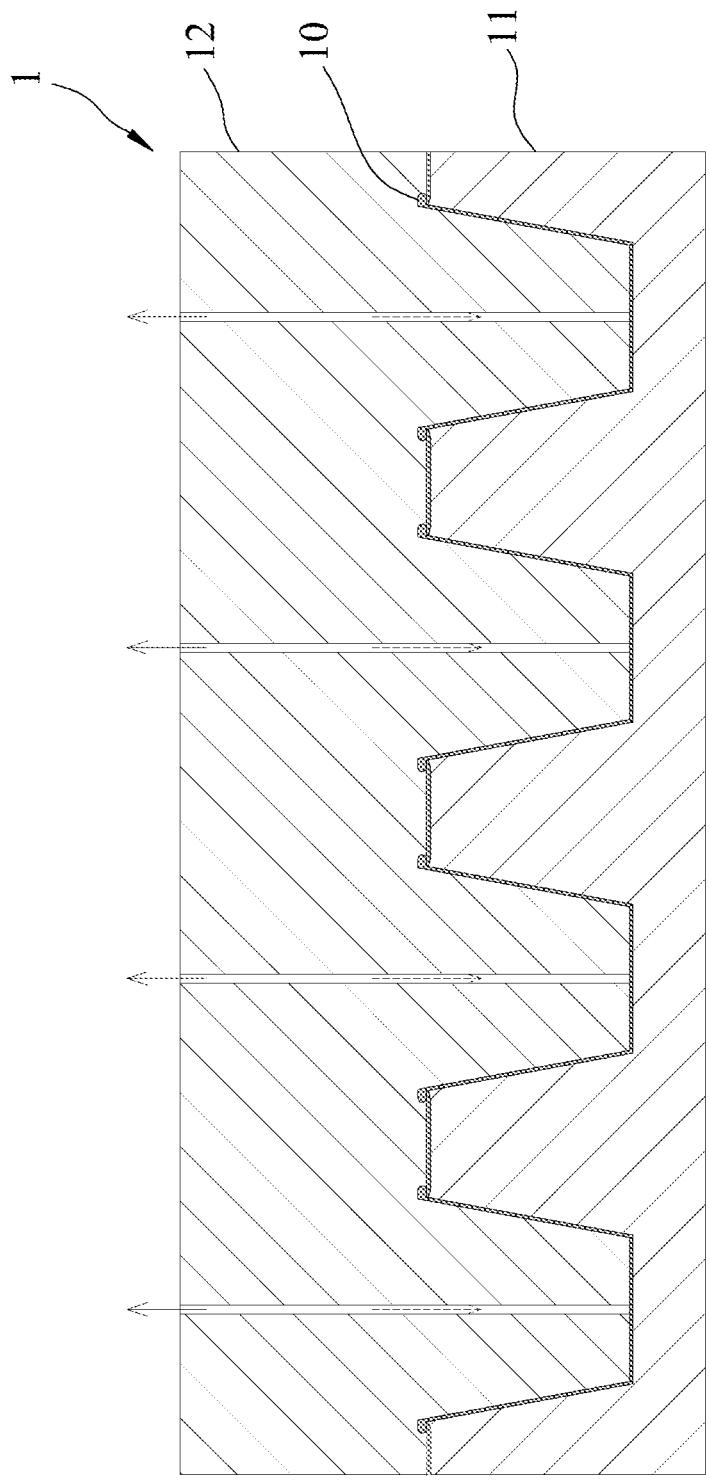
FIG. 1 is a schematic view of a demolding device of a conventional molding system.
Figure 2:
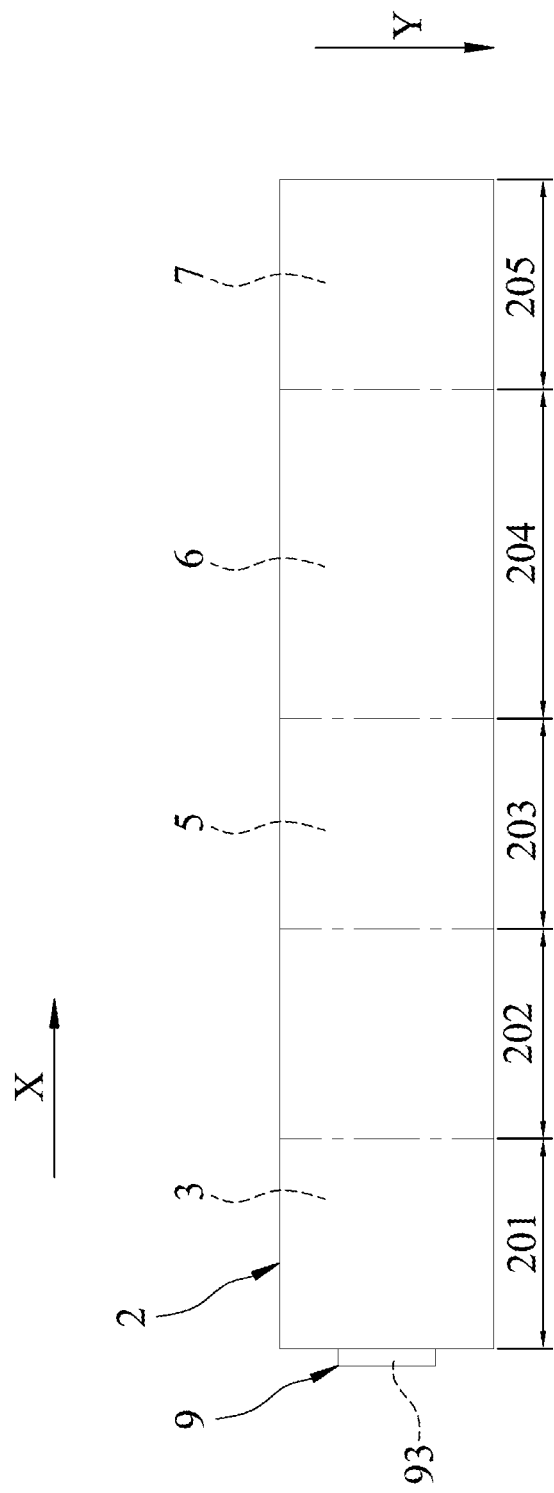
FIG. 2 is a schematic view of an embodiment of a molding system according to the disclosure.
Figure 3:
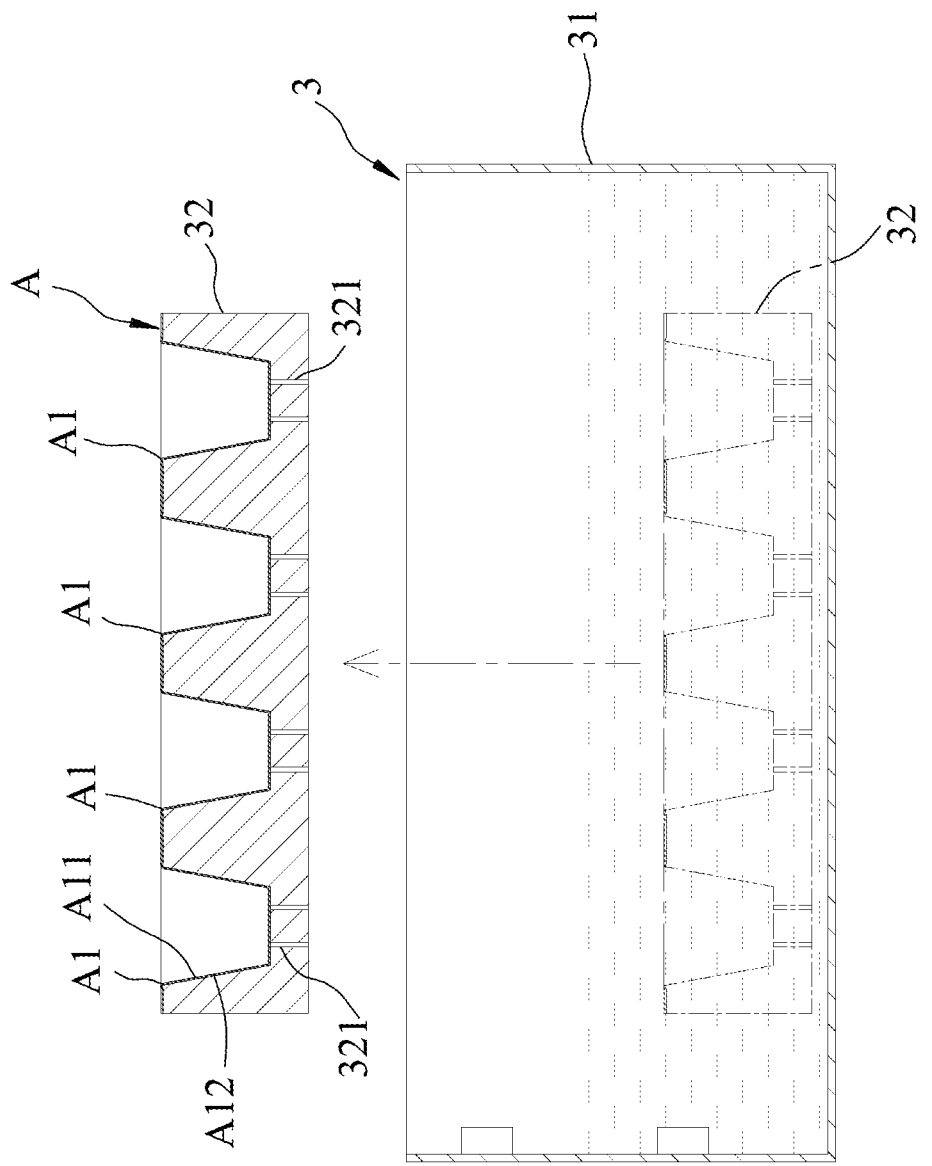
FIG. 3 is a sectional view of a portion of the embodiment, illustrating a scooping mold of the embodiment scooping a slurry.
Figure 4:
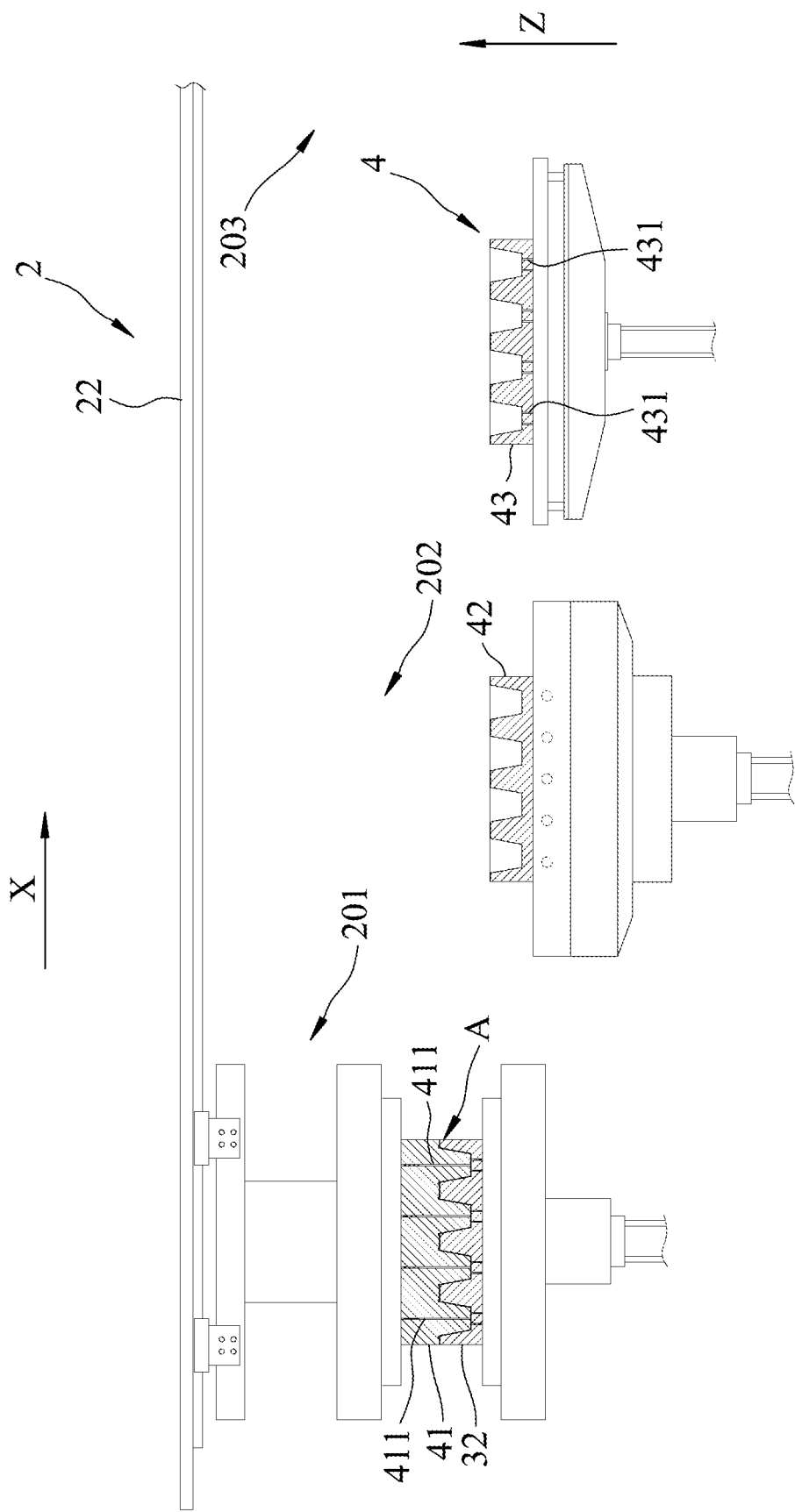
FIG. 4 is a fragmentary, partly sectional view illustrating the scooping mold and a first mold of the embodiment coupled to each other.

Referring to FIGS. 2 to 4, an embodiment of a molding system according to the disclosure is adapted for use with a slurry. The molding system includes a frame device 2, a scooping device 3, a demolding device 4, a cutting device 5 (see FIG. 7), an inspection device 6 (see FIG. 9), a packaging device 7 (see FIG. 12), a conveying device 8 (see FIG. 9), and a controlling device 9.

The frame device 2 defines a scooping zone 201, a hot pressing zone 202, a cutting zone 203, an inspection zone 204 and a packaging zone 205. In this embodiment, the scooping zone 201, the hot pressing zone 202, the cutting zone 203, the inspection zone 204 and the packaging zone 205 are sequentially arranged in a longitudinal direction (X). The frame device 2 includes a frame, two mold rails 22 (only one is visible due to the viewing angle in FIG. 4) that are spaced from each other in a transverse direction (Y) perpendicular to the longitudinal direction (X), and two rack rails 23 (only one is visible due to the viewing angle in FIG. 7) that are spaced from each other in the transverse direction (Y). Each of the mold rails 22 extends from the scooping zone 201 to the cutting zone 203 in the longitudinal direction (X). Each of the rack rails 23 extends from the hot pressing zone 202 to the inspection zone 204 in the longitudinal direction (X).

However, it is noted that, in certain modifications of the embodiment, the scooping zone 201, the hot pressing zone 202 and the cutting zone 203 may be arranged about an axis, but is not thus limited.

The scooping device 3 is disposed at the scooping zone 201 and includes a pulp tank 31 that is adapted to contain the slurry, and a scooping mold 32 that is adapted to scoop the slurry such that the slurry forms a blank unit (A) thereon. The scooping mold 32 has a plurality of channels 321 through which superfluous water in the slurry drains away from the scooping mold 32 when the scooping mold 32 scoops the slurry. Each of the channels 321 of the scooping mold 32 is operable to generate an airflow that removes water from the slurry.

In this embodiment, the slurry is a pulp that is used to make paper products, such as paper stands, paper cups, paper plates and paper bowls. The blank unit (A) includes a plurality of blank bodies (A1) that are arranged in an array and that are interconnected. Each of the blank bodies (A1) has a first surface (A11) and a second surface (A12) opposite to the first surface (A11). In one embodiment, when the slurry forms the blank unit (A) on the scooping mold 32, the second surfaces (A12) of the blank bodies (A1) face the scooping mold 32.

Figure 5:
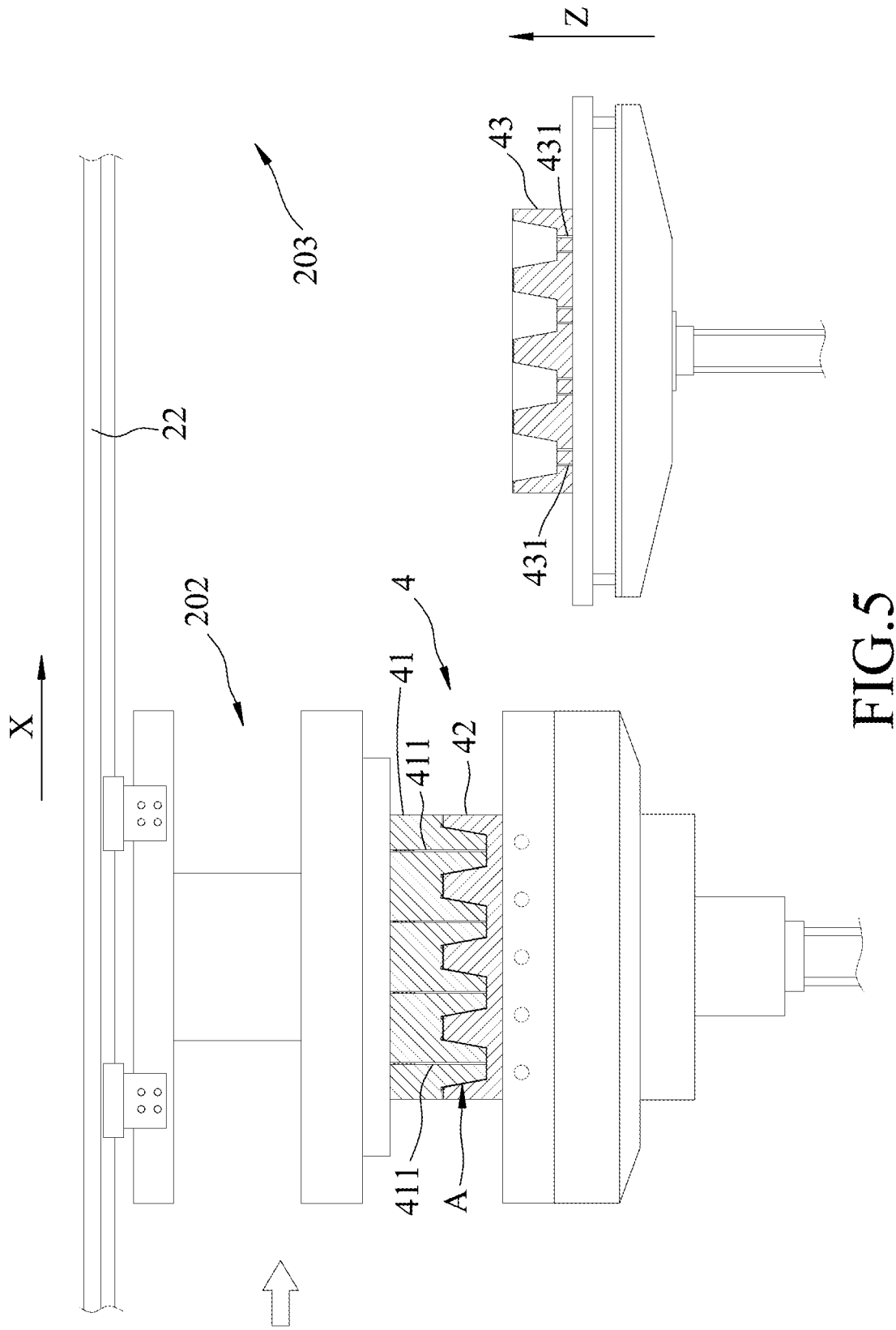
FIG. 5 is a fragmentary, partly sectional view illustrating the first mold and a hot pressing mold of the embodiment coupled to each other.
Figure 6:
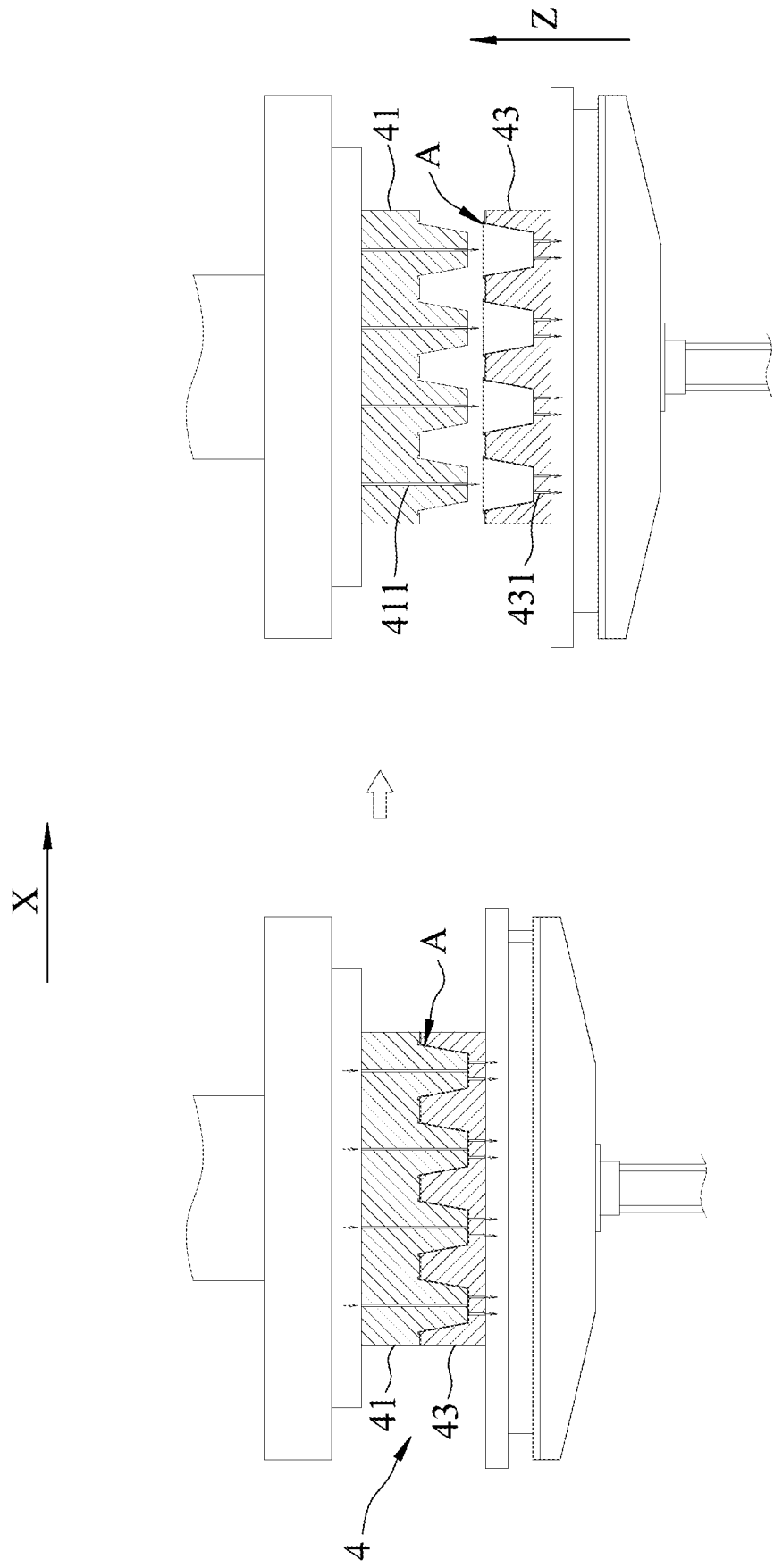
FIG. 6 is a fragmentary, partly sectional view illustrating the first mold and a second mold of the embodiment coupled to each other and then separated from each other.
Figure 7:
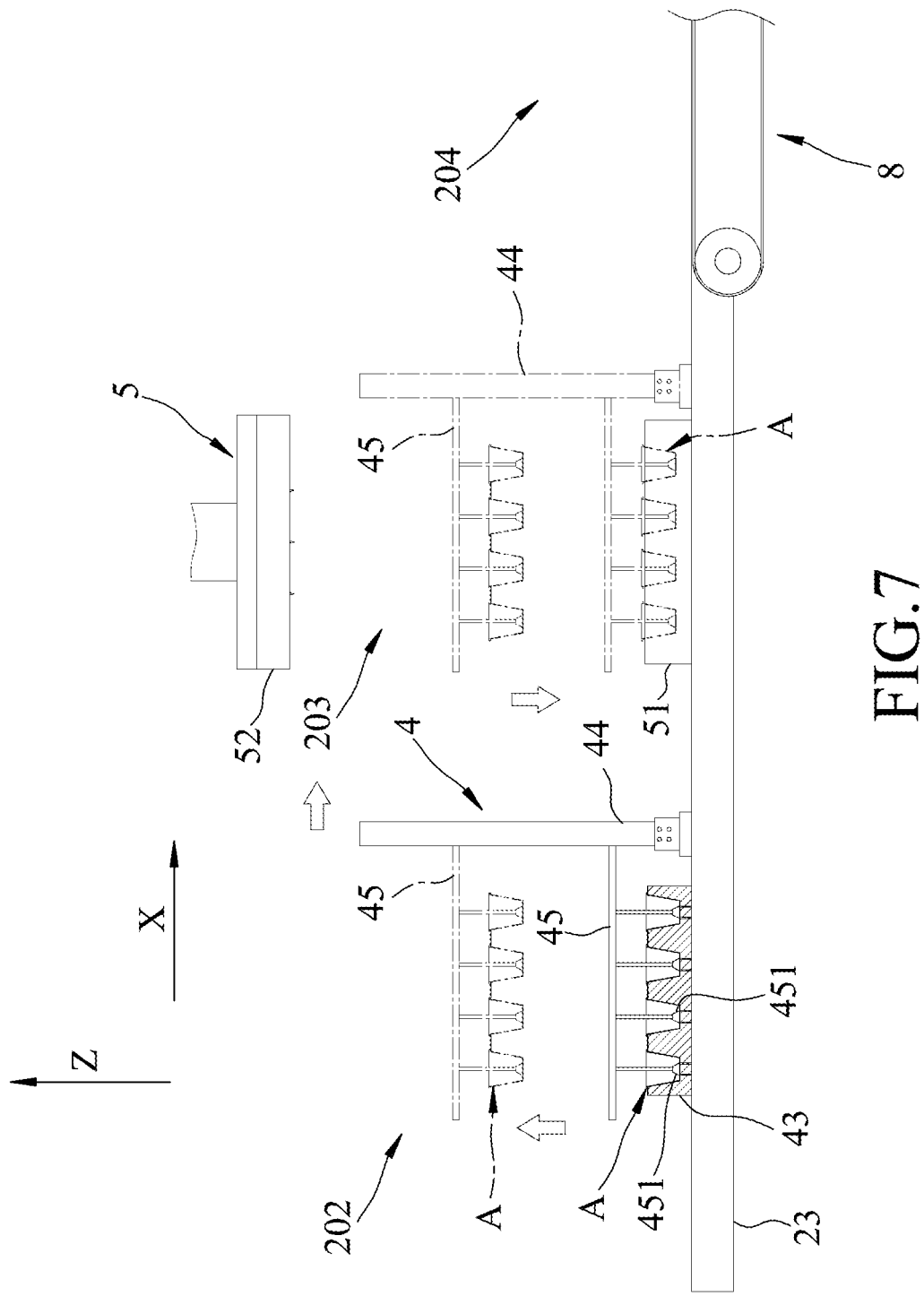
FIG. 7 illustrates a blank unit demolded from the second mold and released onto a first cutting mold of the embodiment by a demolding suction carrier of the embodiment.

Referring further to FIGS. 5 to 7, the demolding device 4 includes a first mold 41, a hot pressing mold 42, a second mold 43, a demolding rack 44 and a demolding suction carrier 45. The first mold 41 is slidably mounted to the mold rails 22 of the frame device 2, and is operable to move back and forth between the scooping zone 201 and the hot pressing zone 202 of the frame device 2. The hot pressing mold 42 is disposed at the hot pressing zone 202 and is operable to generate heat. The second mold 43 is disposed at a boundary between the hot pressing zone 202 and the cutting zone 203 of the frame device 2. The demolding rack 44 is slidably mounted to the rack rails 23 of the frame device 2, extends in an up-down direction (Z) perpendicular to the longitudinal direction (X) and the transverse direction (Y) (only the up-down direction (Z) and the longitudinal direction (X) are visible due to the viewing angle in FIG. 7), and is operable to move back and forth between the hot pressing zone 202 and the cutting zone 203 in the longitudinal direction (X). The demolding suction carrier 45 is slidably mounted to the demolding rack 44 so as to be operable to move back and forth between the hot pressing zone 202 and the cutting zone 203 synchronously with the demolding rack 44, and is movable relative to the demolding rack 44 in the up-down direction (Z).

The first mold 41 is operable to be separably coupled to the scooping mold 32 of the scooping device 3, the hot pressing mold 42 and the second mold 43 sequentially, and has a plurality of channels 411 each of which is operable to generate an airflow. Via the airflows generated by the channels 411, the first mold 41 is adapted to suck the blank unit (A) so that the blank unit (A) is demolded from the scooping mold 32, is adapted to convey the blank unit (A) from the scooping mold 32 to the hot pressing mold 42 such that the blank unit (A) is heated and compressed between the first mold 41 and the hot pressing mold 42 to form in the shape of the first mold 41, and is adapted to convey the blank unit (A) from the hot pressing mold 42 to the second mold 43.

The second mold 43 has a plurality of channels 431 each of which is operable to generate an airflow. When the blank unit (A) is conveyed to the second mold 43 by the first mold 41, the first mold 41 and the second mold 43 are separably coupled to each other. Then, the direction of the airflows generated by the channels 411 of the first mold 41 is reversed so that the first mold 41 pushes the blank unit (A) away via the airflows. At this time, the first mold 41 moves away from the second mold 43, and the second mold 43 is adapted to suck the blank unit (A) via the airflows generated by the channels 431 so that the blank unit (A) is demolded from the first mold 41 and is located on the second mold 43.

It is noted that, one of the first mold 41 and the scooping mold 32 is operable to move relative to the other one of the first mold 41 and the scooping mold to be separably coupled to the other one of the first mold 41 and the scooping mold 32. One of the first mold 41 and the hot pressing mold 42 is operable to move relative to the other one of the first mold 41 and the hot pressing mold 42 to be separably coupled to the other one of the first mold 41 and the hot pressing mold 42. One of the first mold 41 and the second mold 43 is operable to move relative to the other one of the first mold 41 and the second mold 43 to be separably coupled to the other one of the first mold 41 and the second mold 43.

The demolding suction carrier 45 includes a plurality of demolding suction members 451 each of which is operable to generate an airflow. When the blank unit (A) is located on the second mold 43, each of the demolding suction members 451 is operable to suck the blank unit (A) via the airflow so that the blank unit (A) is demolded from the second mold 43 and carried by the demolding suction carrier 45, is operable to convey the blank unit (A) to the cutting device 5, and is operable to cease the airflow to release the blank unit (A) onto the cutting device 5.

Figure 8:
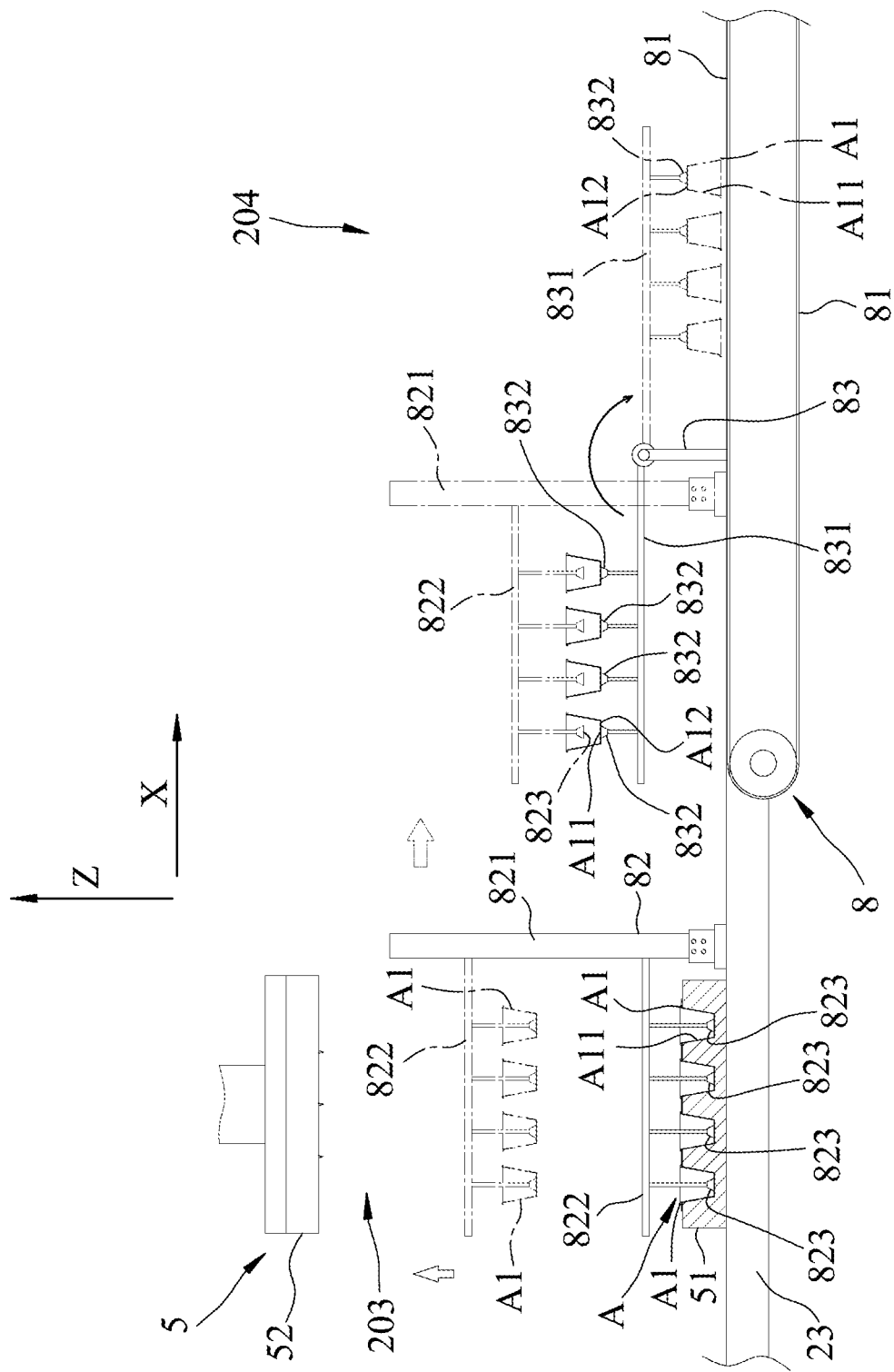
FIG. 8 illustrates a plurality of blank bodies separated from the first cutting mold by a first conveying unit of the embodiment and then released onto a first conveyor of the embodiment by a second conveying unit of the embodiment.

Referring further to FIG. 8, the cutting device 5 is disposed at the cutting zone 203 of the frame device 2, is adapted to cut the blank unit (A) into the blank bodies (A1), and includes a first cutting mold 51 and a second cutting mold 52 that are spaced apart from each other in the up-down direction (Z). The first cutting mold 51 is adapted to support the blank unit (A) that had been heated and compressed. One of the first cutting mold 51 and the second cutting mold 52 is movable relative to the other one of the first cutting mold 51 and the second cutting mold 52 to be separably coupled to the other one of the first cutting mold 51 and the second cutting mold 52. When the first cutting mold 51 and the second cutting mold 52 are coupled to each other after the blank unit (A) is placed on the first cutting mold 51, the blank unit (A) is cut into the blank bodies (A1) (i.e., at this time, the blank bodies (A1) are no longer interconnected). In this embodiment, the first cutting mold 51 is fixedly mounted to the frame, and the second cutting mold 52 is operable to move to be separably coupled to the first cutting mold 51.

It is noted that, in this embodiment, the scooping mold 32 has a plurality of mold cavities that are arranged in an array so that the slurry forms the connected blank bodies (A1) (i.e., the blank unit (A)) that are arranged in the array on the scooping mold 32. Each of the hot pressing mold 42, the second mold 43 and the first cutting mold 51 has a plurality of mold cavities that are arranged in an array the same as that of the mold cavities of the scooping mold 32 so that the array of the blank bodies (A1) remains the same when the blank unit (A) is conveyed from the scooping mold 32 to the hot pressing mold 42, from the hot pressing mold 42 to the second mold 43, and from the second mold 43 to the first cutting mold 51. The first mold 41 has a plurality of mold cores that are arranged in an array the same as that of the mold cavities of each of the scooping mold 32, the hot pressing mold 42, and the second mold 43 so as to be separably coupled to each of the scooping mold 32, the hot pressing mold 42, and the second mold 43 sequentially. The mold cores of the first mold 41 are respectively aligned with the mold cavities of the hot pressing mold 42 so the blank unit (A) forms in the shape of the first mold 41 when the first mold 41 and the hot pressing mold 42 are coupled to each other. At least one of the first cutting mold 51 and the second cutting mold 52 includes a plurality of cutting members that respectively correspond in position to the connections among the blank bodies (A1) so as to cut the blank unit (A) into the blank bodies (A1) when the first cutting mold 51 and the second cutting mold 52 are coupled to each other after the blank unit (A) is placed on the first cutting mold 51. However, in certain embodiments, each of the scooping mold 32, the hot pressing mold 42, the second mold 43 and the first cutting mold 51 may have a plurality of mold cores that are arranged in an array, while the first mold 41 has a plurality of mold cavities that are arranged in the array the same as that of the mold cores of each of the scooping mold 32, the hot pressing mold 42, the second mold 43 and the first cutting mold 51.

Figure 9:
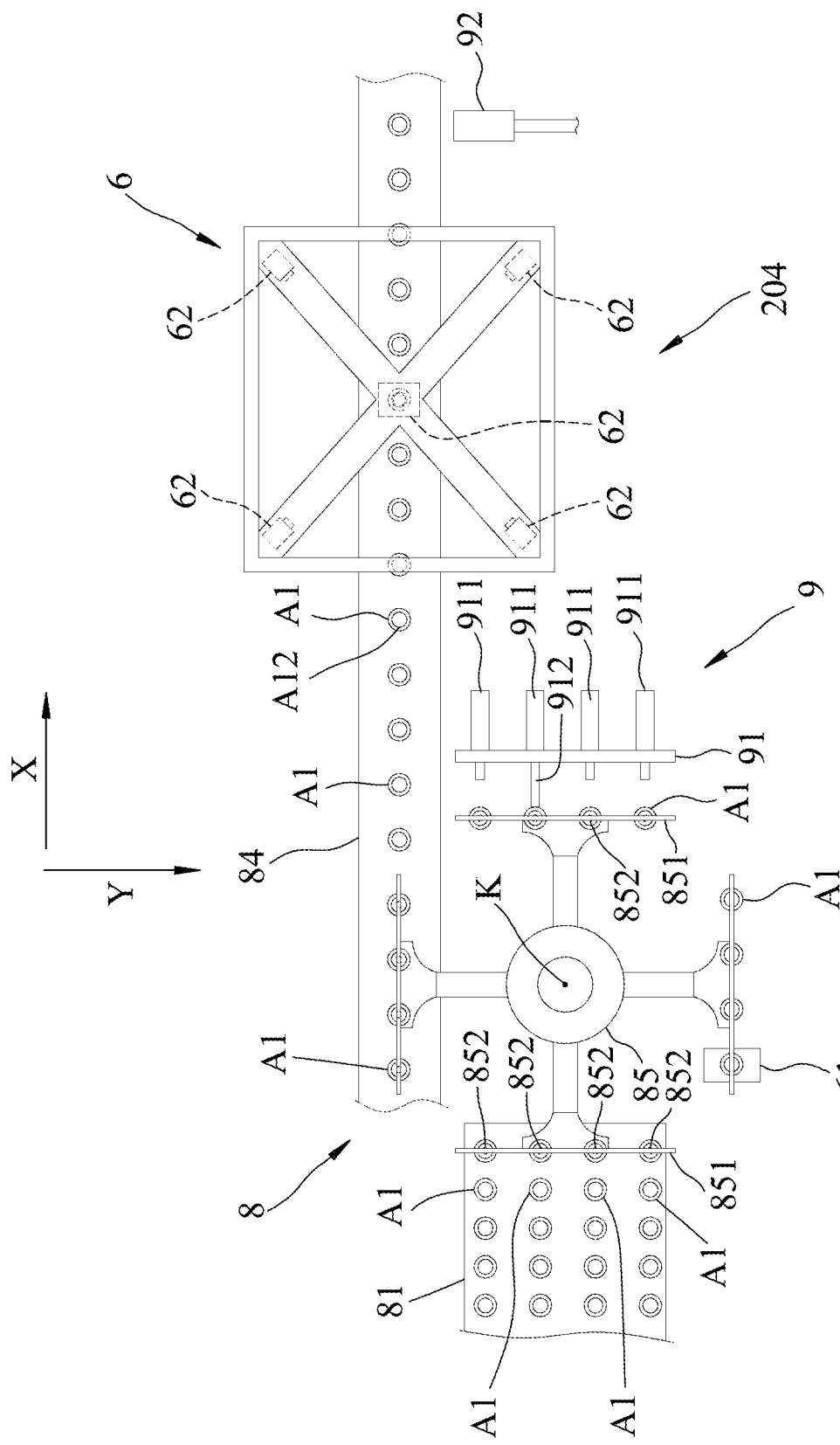
FIG. 9 is a fragmentary top view illustrating the blank bodies conveyed from the first conveyor to a second conveyor of the embodiment by a third conveying unit of the embodiment, and illustrating an inspection device of the embodiment inspecting each of the blank bodies.
Figure 10:
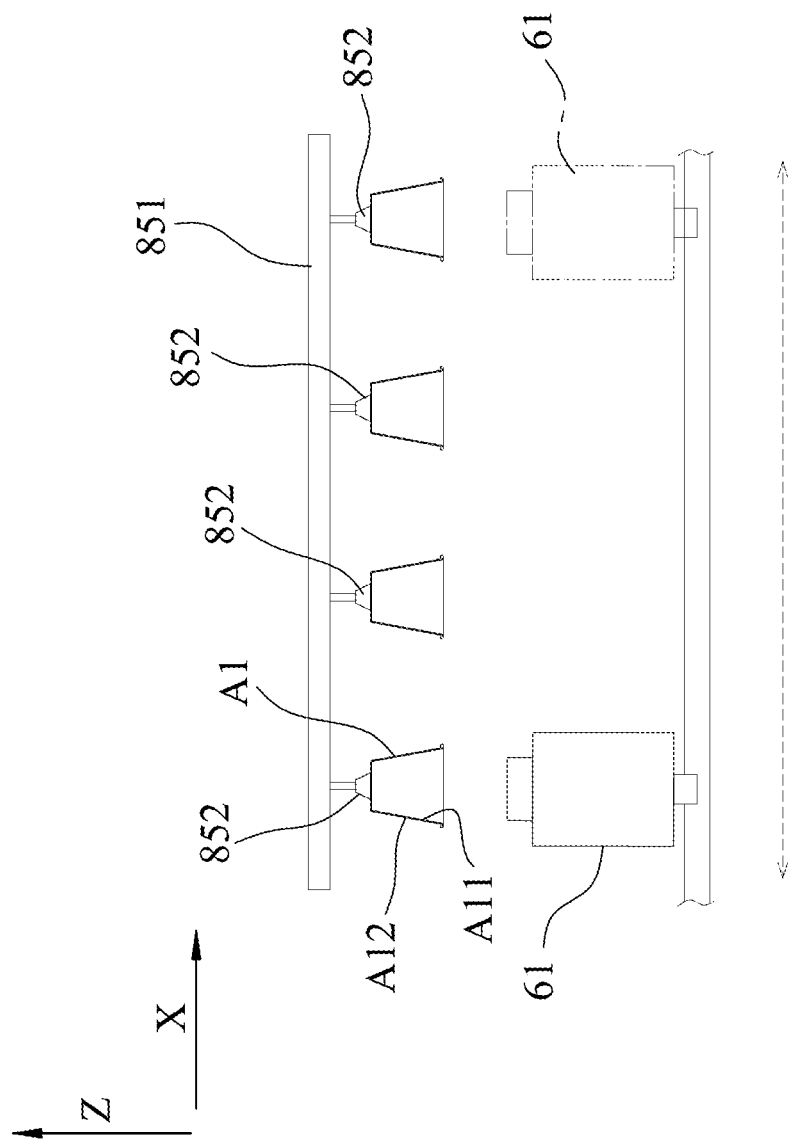
FIG. 10 illustrates the inspection device inspecting a first surface of each of the blank bodies.

Referring further to FIGS. 9 and 10, the conveying device 8 defines a blank conveying path along which the blank bodies (A1) are conveyed, and the inspection device 6 is disposed at the inspection zone 204 of the frame device 2 and is adjacent to the blank conveying path. The inspection device 6 defines an inspection area that partially overlaps the blank conveying path, and is adapted to inspect each of the blank bodies (A1) so as to generate at least one inspection datum accordingly. In this embodiment, the inspection device 6 includes a first camera unit 61 and five second camera units 62. The first camera unit 61 is disposed on the frame, is operable to move in the longitudinal direction (X), and is adapted to capture an image of the first surface (A11) of each of the blank bodies (A1) so as to acquire one inspection datum of the blank body (A1). The second camera units 62 are disposed on the frame, and are adapted to face each of the blank bodies (A1) that are conveyed across the inspection area along the blank conveying path from different angles. Specifically, one of the second camera units is located over the blank conveying path, and the other four of the second camera units 62 are located about a camera axis (not shown) that extends through the blank conveying path and the one of the second camera units 62 in the up-down direction (Z). The second camera units 62 cooperatively define the inspection area. Each of the second camera units 62 is adapted to capture an image of the second surface (A12) of each of the blank bodies (A1) that are conveyed across the inspection area so as to acquire another one inspection datum of the blank body (A1).

Figure 11:
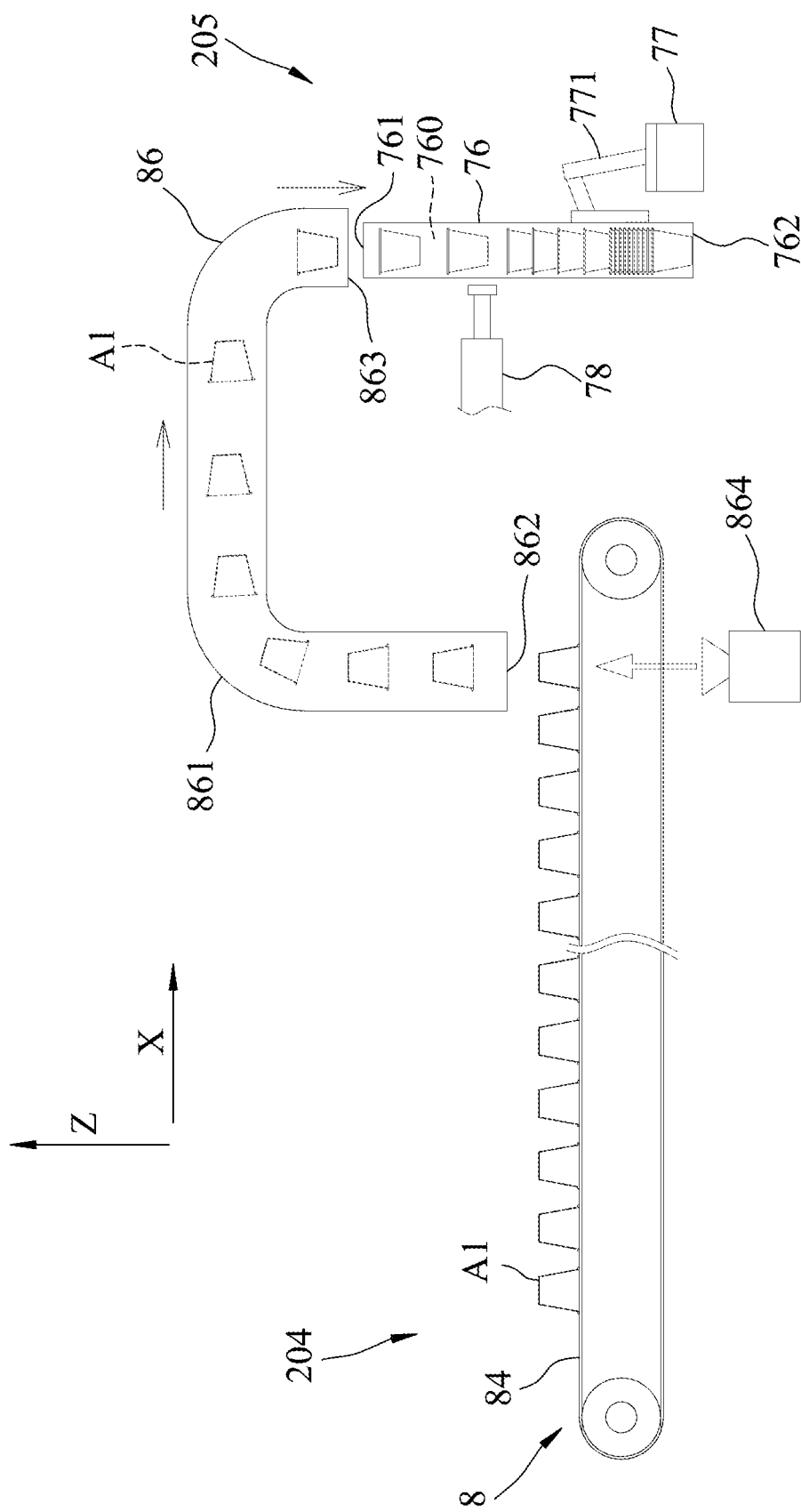
FIG. 11 illustrates the blank bodies overturned after traveling through a hollow tube of the embodiment, and stacked one above another.
Figure 12:
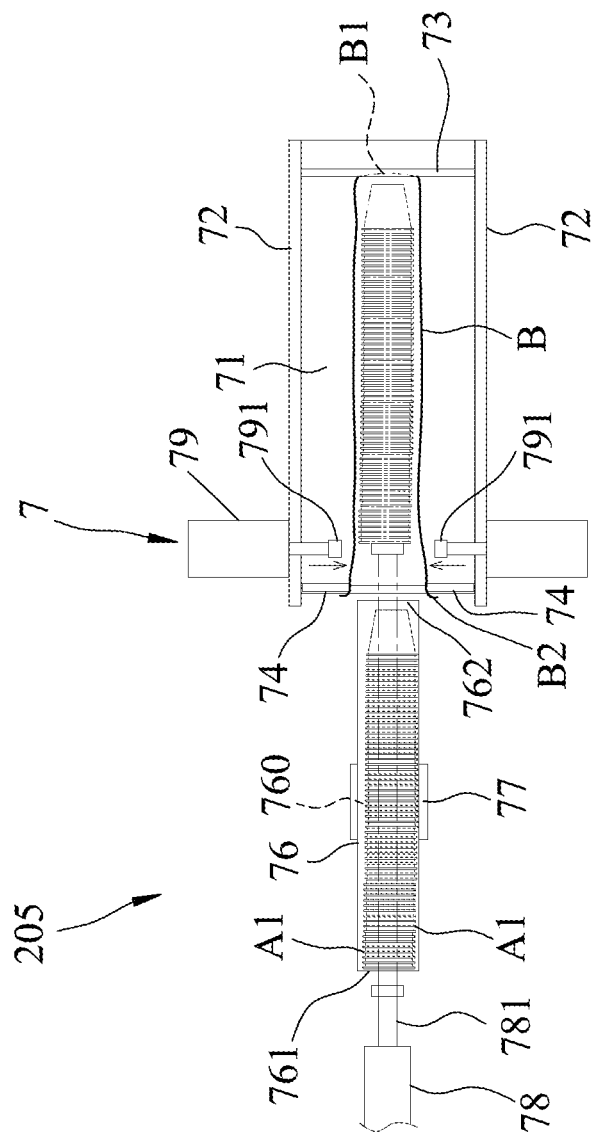
FIG. 12 illustrates a packaging device of the embodiment wrapping the blank bodies in a packaging bag.

Referring further to FIGS. 11 and 12, the packaging device 7 is disposed at the packaging zone 205 of the frame device 2 and is adapted to wrap the blank bodies (A1) in a packaging bag (B). The packaging device 7 includes two pulling rods 72, a restraining unit 73, two holding units 74, a packaging tube 76, an orientation unit 77, a pushing unit 78 and a packaging unit 79. The pulling rods 72 are spaced apart from each other. Each of the pulling rods 72 has two opposite ends. The restraining unit 73 is mounted to one of the opposite ends of each of the pulling rods 72, cooperates with the pulling rods 72 to define a packaging space 71 that opens at the other one of the opposite ends of each of the pulling rods 72 and that is adapted to accommodate the packaging bag (B), and is adapted to restrain a closed end (B1) of the packaging bag (B) from moving. The holding units 74 are respectively and slidably mounted to the pulling rods 72, are adapted to cooperatively and separably hold an open end (B2) of the packaging bag (B) so that the open end (B2) of the packaging bag (B) opens toward the other one of the opposite ends of each of the pulling rods 72, and are slidable between a first bag position, at which the holding units 74 are proximate to the restraining unit 73, and at which the open end (B2) and the closed end (B1) of the packaging bag (B) are proximate to each other, and a second bag position, at which the holding units 74 are distal from the restraining unit 73, and at which the packaging bag (B) extends from the one of the opposite ends of each of the pulling rods 72 to the other one of the opposite ends of the pulling rod 72 so that the open end (B2) and the closed end (B1) thereof are distal from each other.

The packaging tube 76 defines a stacking space 760, and has a blank body entering opening 761 and a blank body exiting opening 762 opposite to the blank body entering opening 761. The stacking space 760 communicates with the external environment through the blank body entering opening 761 and the blank body exiting opening 762, and is adapted to accommodate the stacked blank bodies (A1) before the stacked blank bodies (A1) enter the packaging bag (B) through the open end (B2) of the packaging bag (B). How the blank bodies (A1) are stacked will be described later in the paragraph about a fourth conveying unit 86 of the conveying device 8. The blank body entering opening 761 is adapted for the stacked blank bodies (A1) to enter the stacking space 760. The blank body exiting opening 762 is adapted for the stacked blank bodies (A1) to exit the stacking space 760.

The orientation unit 77 includes an orientation arm subunit 771 that is disposed on the frame, that is connected to the packaging tube 76, and that is operable to orient the blank body exiting opening 762 of the packaging tube 76 to the packaging space 71 so that the stacked blank bodies (A1) enter the packaging bag (B) after exiting the stacking space 760.

The pushing unit 78 includes a stack pushing rod 781 that is operable to enter the stacking space 760 through the blank body entering opening 761. When the stacked blank bodies (A1) are accommodated in the stacking space 760, the stack pushing rod 781 is adapted to push the stacked blank bodies (A1) so that the stacked blank bodies (A1) are urged to exit the stacking space 760 through the blank body exiting opening 762 and to enter the packaging bag (B) that is in the packaging space 71 through the open end (B2) of the packaging bag (B). In this embodiment, the pushing unit 78 is configured to be a hydraulic cylinder.

The packaging unit 79 includes two heat pressing subunits 791 that are adapted to close the open end (B2) of the packaging bag (B) by heat press. At least one of the heat pressing subunits 791 is operable to move relative to another one of the heat pressing subunits 791 to cooperatively heat press the open end (B2) of the packaging bag (B) to close the open end (B2). In this embodiment, the heat pressing subunits 791 are operable to move relative to each other.

Referring to FIGS. 8, 9 and 11 again, the conveying device 8 is disposed at the frame and is adapted to convey the blank bodies (A1) from the cutting zone 203 to the packaging zone 205 through the inspection zone 204 of the frame device 2. The conveying device 8 includes a first conveyor 81, a second conveyor 84, a first conveying unit 82, a second conveying unit 83, a third conveying unit 85 and the fourth conveying unit 86.

The first conveyor 81 extends from the cutting zone 203 to the inspection zone 204 of the frame device 2 in the longitudinal direction (X), and is adapted to convey the blank bodies (A1) in the longitudinal direction (X).

The first conveying unit 82 is convertible between a carrying state, in which the first conveying unit 82 is operable to generate an airflow to suck the blank bodies (A1) such that the blank bodies (A1) are separated from the first cutting mold 51 of the cutting device 5, and a releasing state, in which the first conveying unit 82 is operable to cease the airflow such that the blank bodies (A1) are released. The first conveying unit 82 includes a conveying rack 821 and a separating suction rack 822. The conveying rack 821 extends in the up-down direction (Z), and is slidable along the rack rails 23 of the frame device 2 in the longitudinal direction (X) between a carrying position, at which the conveying rack 821 is distal from the first conveyor 81, and a releasing position, at which the conveying rack 821 is proximate to the first conveyor 81. The separating suction rack 822 is slidably mounted to the conveying rack 821 so that the separating suction rack 822 is slidable along the conveying rack 821 in the up-down direction (Z) and is co-movable with the conveying rack 821 in the longitudinal direction (X). The separating suction rack 822 includes a plurality of separating suction members 823 (only four are visible due to the viewing angle in FIG. 8) that are operable to generate an airflow, and that are arranged in an array with m rows in the transverse direction (Y) by n columns in the longitudinal direction (X) (i.e., the separating suction members 823 of each row are disposed in the longitudinal direction (X), and the separating suction members 823 of each column are disposed in the transverse direction (Y)). Each of m and n is a positive integer. In this embodiment, m and n are both 4.

When the blank bodies (A1) are on the first cutting mold 51 of the cutting device 5, and when the first conveying unit 82 is in the carrying state, the conveying rack 821 is at the carrying position (see the conveying rack 821 depicted by solid lines in FIG. 8) and each of the separating suction members 823 of the separating suction rack 822 is adapted to suck the first surface (A11) of a respective one of the blank bodies (A1) via the airflow such that the blank bodies (A1) are separated from the first cutting mold 51. When the first conveying unit 82 is in the releasing state, the conveying rack 821 is at the releasing position (see the conveying rack 821 depicted by broken lines in FIG. 8) and each of the separating suction members 823 is operable to cease the airflow such that the blank bodies (A1) are released. Specifically, when the conveying rack 821 is at the releasing position, the blank bodies (A1) are located over the first conveyor 81 of the conveying device 8.

The second conveying unit 83 includes an overturning suction rack 831 that is rotatably mounted to the frame, and that includes a plurality of overturning suction members 832 (only four are visible due to the viewing angle in FIG. 8). The overturning suction members 832 are operable to generate an airflow and are arranged in an array the same as that of the separating suction members 823 of the first conveying unit 82. The overturning suction rack 831 is rotatable relative to the frame device 2 between a first rotating position and a second rotating position. When the overturning suction rack 831 is at the first rotating position and when the conveying rack 821 of the first conveying unit is at the releasing position (see the overturning suction rack 831 depicted by solid lines and the conveying rack 821 depicted by broken lines in FIG. 8), the overturning suction rack 831 is proximate to the conveying rack 821 and is spaced apart from the separating suction rack 822 of the first conveying unit 82 in the up-down direction (Z), such that each of the overturning suction members 832 faces the separating suction rack 822 and is adapted to suck the second surface (A12) of a respective one of the blank bodies (A1) via the airflow when the blank bodies (A1) are released from the separating suction members 823. When the overturning suction rack 831 is at the second rotating position (see the overturning suction rack 831 depicted by broken lines), the overturning suction rack 831 is distal from the conveying rack 821 that is at the releasing position, and each of the overturning suction members 832 sucks and moves the respective one of the blank bodies (A1) to face the first conveyor 81 of the conveying device 8, and is operable to cease the airflow such that the blank bodies (A1) are released onto the first conveyor 81 in a manner that overturns the blank bodies (A1). Specifically, in this embodiment, the first surface (A11) of each of the blank bodies (A1) faces upwardly when the overturning suction rack 831 is at the first rotating position, and when the overturning suction rack 831 is rotated from the first rotating position to the second rotating position, each of the blank bodies (A1) turns 180 degrees so the first surface (A11) of each of the blank bodies (A1) faces the first conveyor 81. By virtue of the separating suction members 823 of the first conveying unit 82 being arranged in the array, the blank bodies (A1) that are released from the first conveying unit 82 are arranged in an array the same as that of the separating suction members 823, and by virtue of the overturning suction members 832 being arranged in the same array as that of the separating suction members 823, the blank bodies (A1) are conveyed by the first conveyor 81 in the same manner (i.e., m, which is 4 in this embodiment, rows in the transverse direction (Y) by n, which is 4 in this embodiment, columns in the longitudinal direction (X)).

The second conveyor 84 partially defines the blank conveying path, extends from the inspection zone 204 to the packaging zone 205 of the frame device 2 in the longitudinal direction (X), and is adapted to convey the blank bodies (A1) in the longitudinal direction (X) across the inspection area of the second camera units 62 of the inspection device 6. The second camera units 62 are adjacent to the second conveyor 84, and each of the second camera units 62 is operable to capture the image of the second surface (A12) of each of the blank bodies (A1) when the blank bodies (A1) are conveyed across the inspection area by the second conveyor 84.

The third conveying unit 85 is rotatable, partially defines the blank conveying path, is adjacent to the second conveyor 84, and includes a plurality of turning rods 851 that are angularly spaced apart from each other about a first imaginary axis (K) extending in the up-down direction (Z). In this embodiment, the third conveying unit 85 is also adjacent to the first conveyor 81 of the conveying device 8, and is adapted to suck the blank bodies (A1) conveyed by the first conveyor 81 a column at a time so as to convey the blank bodies (A1) from the first conveyor 81 to the second conveyor 84 in a manner that arranges the blank bodies (A1) in a row in the longitudinal direction (X). Each of the turning rods 851 includes m turning suction members 852 that are arranged perpendicularly to the first imaginary axis (K) and that are operable to generate an airflow, and is rotatable about the first imaginary axis (K) among a first rod transverse position, a first rod longitudinal position, a second rod transverse position and a second rod longitudinal position. In this embodiment, the third conveying unit includes four turning rods 851 that are angularly spaced apart from each other about the first imaginary axis (K) and that are respectively at the first rod transverse position, the first rod longitudinal position, the second rod transverse position and the second rod longitudinal position, and each of the turning rods 851 is rotated 90 degrees counterclockwise about the first imaginary axis (K) during each movement from the first rod transverse position to the first rod longitudinal position, from the first rod longitudinal position to the second rod transverse position, from the second rod transverse position to the second rod longitudinal position, and from the second rod longitudinal position to the first rod longitudinal position. However, in certain embodiments, the first rod longitudinal position and the second rod longitudinal position may be exchanged (i.e., each of the turning rods 851 is rotated 90 degrees counterclockwise about the first imaginary axis (K) from the first rod transverse position to the second rod longitudinal position, from the second rod longitudinal position to the second rod transverse position, from the second rod transverse position to the first rod longitudinal position, and from the first rod longitudinal position to the first rod longitudinal position sequentially). When one of the turning rods 851 is at the first rod transverse position, the turning suction members 852 of the one of the turning rods 851 are in a transverse arrangement (i.e., the turning suction members 852 of the one of the turning rods 851 are arranged along the transverse direction (Y)), face the first conveyor 81, and correspond in position to one of the columns of the blank bodies (A1) so as to be adapted to respectively suck the blank bodies (A1) in the one of the columns via the airflow. Since m is 4 in this embodiment, as shown in FIG. 9, the turning suction members 852 of the one of the turning rods 851 respectively suck four of the blank bodies (A1) on the first conveyor 81. When the one of the turning rods 851 is rotated from the first rod transverse position to be at the first rod longitudinal position, the turning suction members 852 thereof are in a longitudinal arrangement, and the first camera unit 61 of the inspection device 6 faces the one of the turning rods 851 (see FIG. 10), and is adapted to capture the images of the first surfaces (A11) of the blank bodies (A1) that are respectively sucked by the turning suction members 852 of the one of the turning rods 851. When the one of the turning rods 851 is rotated from the first rod longitudinal position to be at the second rod transverse position, the turning rod 851 is spaced apart from the first conveyor 81 in the longitudinal direction (X), and the turning suction members 852 of the turning rod 851 are in the transverse arrangement. When the one of the turning rods 851 is rotated from the second rod transverse position to be at the second rod longitudinal position, the turning suction members 852 thereof are in the longitudinal arrangement, face the second conveyor 84, and are adapted to release the one of the columns of the blank bodies (A1), by ceasing the airflow, onto the second conveyor 84 in a manner that arranges the released blank bodies (A1) in the row in the longitudinal direction (X).

The fourth conveying unit 86 is disposed at the packaging zone 205 of the frame device 2, is adjacent to the second conveyor 84 of the conveying device 8, and includes a hollow tube 861 and an airflow-generating subunit 864. The hollow tube 861 is configured to be U-shaped, and has an inlet opening 862 that opens downwardly toward the second conveyor 84, and an outlet opening 863 that opens downwardly. The airflow-generating subunit 864 is operable to generate an airflow that flows into the hollow tube 861 through the inlet opening 862 of the hollow tube 861 and out of the hollow tube 861 through the outlet opening 863 of the hollow tube 861, and is adapted to urge each of the blank bodies (A1) that are conveyed by the second conveyor 84 to enter the hollow tube 861 through the inlet opening 862 and to exit the hollow tube 861 through the outlet opening 863 via the airflow, so that the blank bodies (A1) are overturned after traveling through the hollow tube 861 and are stacked one above another. In this embodiment, the orientation arm subunit 771 of the orientation unit 77 is operable to orient the blank body entering opening 761 of the packaging tube 76 to the outlet opening 863 of the hollow tube 861 so that the blank bodies (A1) enter the stacking space 760 of the packaging tube 76 through the blank body entering opening 761 of the packaging tube 76 after exiting the outlet opening 863 of the hollow tube 861 and are stacked one above another.

Referring to FIGS. 2 and 9 again, the controlling device 9 is disposed on the frame, and includes a first removing unit 91, a second removing unit 92 and a controller 93. The controller 93 is electrically coupled to the scooping device 3, the demolding device 4, the cutting device 5, the inspection device 6, the packaging device 7, the conveying device 8, the first removing unit 91 and the second removing unit 92. However, in certain embodiments, the controller 93 may only be electrically coupled to the third conveying unit 85 of the conveying device 8, the first camera unit 61 of the inspection device 6, the second camera units 62 of the inspection device 6, the first removing unit 91 and the second removing unit 92.

The controller 93 is adapted to determine whether each of the blank bodies (A1) is defective according to the inspection data of each of the blank bodies (A1), and is operable to control at least one of the first removing unit 91 and the second removing unit 92 to remove one of the blank bodies (A1) from the blank conveying path when the one of blank bodies (A1) is determined to be defective by the controller 93. In this embodiment, the inspection data of each of the blank bodies (A1) are acquired from the image of the first surface (A11) of the blank body (A1) that is captured by the first camera unit 61, and the images of the second surface (A12) of the blank body (A1) that are captured by the second camera units 62. When the inspection data of one of the blank bodies (A1) show that the first surface (A11) of the one of the blank bodies (A1) has a ratio of the defective area to the whole area thereof no less than a first predetermined value, the controller 93 is adapted to determine that the one of the blank bodies (A1) is defective. When the inspection data of one of the blank bodies (A1) show that the second surface (A12) of the one of the blank bodies (A1) has a ratio of the defective area to the whole area thereof no less than a second predetermined value, the controller 93 is adapted to determine that the one of the blank bodies (A1) is defective. Specifically, in this embodiment, the first predetermined value ranges from 1 to 5 percent, and the second predetermined value ranges from 1 to 5 percent. However, in certain modifications of the embodiment, each of the first and second predetermined values may be less than 1 percent or more than 5 percent. For each of the blank bodies (A1), the defective area may be the area of a crack or a stain on one of the first surface (A11) or the second surface (A12) thereof, but the above are merely examples, and the defective area may be defined to include other types of defects as well.

In this embodiment, the first removing unit 91 is disposed between the third conveying unit 85 and the second camera units 62, and includes m hydraulic cylinders 911. Each of the hydraulic cylinders 911 includes a pushing rod 912 that is telescopic and that is adapted to push a respective one of the blank bodies (A1) sucked by one of the turning rods 851 of the third conveying unit 85 away from the one of the turning rods 851 when the respective one of the blank bodies (A1) is determined to be defective by the controller 93 and when the one of the turning rods 851 is at the second rod transverse position, so as to remove the respective one of the blank bodies (A1) from the blank conveying path.

In this embodiment, the second removing unit 92 is disposed at one side of the blank conveying path that is defined by the second conveyor 84 of the conveying device 8, and is configured to be a nozzle that is operable to generate an airflow, and that is adapted to push one of the blank bodies (A1) conveyed across the inspection area by the second conveyor 84 away from the second conveyor 84 via the airflow when the one of the blank bodies (A1) is determined to be defective by the controller 93, so as to remove the one of the blank bodies (A1) from the blank conveying path. It is noted that, in certain modifications of the embodiment, the second removing unit 92 may be configured to be a hydraulic cylinder (not shown) that includes a pushing rod adapted to push one of the blank bodies (A1) conveyed across the inspection area by the second conveyor 84 away from the second conveyor 84 so as to remove the one of the blank bodies (A1) from the blank conveying path.

It is noted that, each of the demolding suction members 451 of the demolding suction carrier 45 has a diameter that ranges from 10 to 40 millimeters, and is operable to exert a suction force that ranges from 3.5 to 94 newtons on the blank unit (A). Each of the separating suction members 823 of the separating suction rack 822 has a diameter that ranges from 10 to 40 millimeters, and is operable to exert a suction force that ranges from 3.5 to 94 newtons on the respective one of the blank bodies (A1). Each of the overturning suction members 832 of the overturning suction rack 831 has a diameter that ranges from 10 to 40 millimeters, and is operable to exert a suction force that ranges from 3.5 to 94 newtons on the respective one of the blank bodies (A1). Each of the turning suction members 852 of the turning rods 851 has a diameter that ranges from 10 to 40 millimeters, and is operable to exert a suction force that ranges from 3.5 to 94 newtons on the respective one of the blank bodies (A1). In this embodiment, the molding system is used with a switching valve (not shown), a vacuum pump (not shown) and a booster pump (not shown). The switching valve communicates the vacuum pump with the channels 321 of the scooping mold 32, the channels 411 of the first mold 41, the channels 431 of the second mold 43, the demolding suction members 451 of the demolding suction carrier 45, the separating suction members 823 of the separating suction rack 822, the overturning suction members 832 of the overturning suction rack 831 and the turning suction members 852 of the turning rods 851 to draw the air so the airflows that remove water from the slurry and the airflows that suck the blank bodies (A1)/the blank unit (A) are generated. In addition, the switching valve communicates the booster pump with the channels 411 of the first mold 41, the airflow-generating subunit 864 of the fourth conveying unit 86 and the second removing unit 92 of the controlling device 9 to provide the air so the airflows that push the blank unit (A), the airflow that flows into the hollow tube 861 of the fourth conveying unit 86 and the airflow that removes the blank bodies (A1) from the blank conveying path are generated.

In operation, each of the scooping device 3, the demolding device 4, the cutting device 5, the inspection device 6, the packaging device 7, the conveying device 8, the first removing unit 91 and the second removing unit 92 of the controlling device 9 is controlled by the controller 93 of the controlling device 9 to complete a pulp molding process for making paper products. A detailed description of an operation cycle of the molding system is given below.

At the beginning, the scooping mold 32 of the scooping device 3 scoops a proper amount of the slurry in the pulp tank 31 of the scooping device 3, and the scooping mold 32 removes most of water from the slurry via the airflows generated by the channels 321 thereof. At this time, the slurry forms the blank unit (A) on the scooping mold 32. Next, the first mold 41 of the demolding device 4 is moved along the mold rails 22 of the frame device 2 to be located over the scooping mold 32. Then, one of the scooping mold 32 and the first mold 41 is moved relative to the other one of the scooping mold 32 and the first mold 41 to be coupled to the other one of the scooping mold 32 and the first mold 41. When the scooping mold 32 and the first mold 41 are coupled, the first mold 41 sucks the blank unit (A) via the airflows generated by the channels 411 thereof so that the blank unit (A) is demolded from the scooping mold 32.

Afterwards, the first mold 41 is separated from the scooping mold 32, is moved along the mold rails 22 to be located over the hot pressing mold 42 of the demolding device 4, and is moved in the up-down direction (Z) to be coupled to the hot pressing mold 42. When the first mold 41 and the hot pressing mold are coupled, the blank unit (A) is heated and compressed so that the remaining water and/or moisture in the blank unit (A) is removed and the blank unit (A) forms in the shape of the first mold 41. Then, while separated from the hot pressing mold 42, the first mold 41 sucks the blank unit (A) via the airflows generated by the channels 411 so that the blank unit (A) is demolded from the hot pressing mold 42.

Next, the first mold 41 is moved along the mold rails 22 to be located over the second mold 43 of the demolding device 4, and one of the first mold 41 and the second mold 43 is moved relative to the other one of the first mold 41 and the second mold 43 in the up-down direction (Z) to be coupled to the other one of the first mold 41 and the second mold 43. After the first mold 41 and the second mold 43 are coupled, the second mold 43 sucks the blank unit (A) via the airflows generated by the channels 431 thereof, and the first mold 41 pushes the blank unit (A) away via the reversed airflows generated by the channels 411. At this time, one of the first mold 41 and the second mold 43 moves away from the other one of the first mold 41 and the second mold 43 so that the blank unit (A) is demolded from the first mold 41 and is located on the second mold 43.

Then, the demolding rack 44 of the demolding device 4 is moved along the rack rails 23 of the frame device 2 to be at a position near the second mold 43, and the demolding suction carrier 45 of the demolding device 4 is moved in the up-down direction (Z) toward the blank unit (A). After that, the demolding suction carrier 45 sucks the blank unit (A) via the airflows generated by the demolding suction members 451 thereof so that the blank unit (A) is demolded from the second mold 43 and carried by the demolding suction carrier 45. Next, the demolding suction carrier 45 is moved away from the second mold 43 in the up-down direction (Z) and the demolding rack 44 is moved along the rack rails 23 to be at a position near the first cutting mold 51 of the cutting device 5. The demolding suction carrier 45 is then moved in the up-down direction (Z) toward the first cutting mold 51, and the airflows that are generated by the demolding suction members 451 are ceased so the blank unit (A) is released onto the first cutting mold 51.

After the blank unit (A) is placed on the first cutting mold 51, the second cutting mold 52 of the cutting device 5 is moved in the up-down direction (Z) to be coupled to the first cutting mold 51. At this time, the blank unit (A) is cut into the blank bodies (A1) by the first cutting mold 51 and the second cutting mold 52. After the blank unit (A) is cut into the blank bodies (A1), the second cutting mold 52 is moved away from the first cutting mold 51.

Next, the conveying rack 821 of the first conveying unit 82 of the conveying device 8 is moved along the rack rails 23 to be at the carrying position, and the separating suction rack 822 of the first conveying unit is moved in the up-down direction (Z) toward the blank bodies (A1). Then, the separating suction rack 822 sucks the first surfaces (A11) of the blank bodies (A1) via the airflows generated by the separating suction members 823 thereof. When the separating suction members 823 respectively suck the blank bodies (A1), the separating suction rack 822 is moved away from the first cutting mold 51 in the up-down direction (Z) so the blank bodies (A1) are separated from the first cutting mold 51. Afterwards, the conveying rack 821 is moved along the rack rails 23 to be at the releasing position. At this time, the overturning suction rack 831 of the second conveying unit 83 of the conveying device 8 is at the first rotating position. Then, the overturning suction rack 831 sucks the second surfaces (A12) of the blank bodies (A1) via the airflows generated by the overturning suction members 832 thereof, and the separating suction rack 822 ceases the airflows generated by the separating suction members 823 to release the blank bodies (A1). After the overturning suction members 832 of the overturning suction rack 831 have respectively sucked the blank bodies (A1), the overturning suction rack 831 is rotated to be at the second rotating position. At this time, the blank bodies (A1) have been turned 180 degrees. Next, the airflows generated by the overturning suction members 832 are ceased so the blank bodies (A1) are released onto the first conveyor 81 of the conveying device 8 in the manner that overturns the blank bodies (A1).

The first conveyor 81 conveys the blank bodies (A1) in the longitudinal direction (X) toward the third conveying unit 85 of the conveying device 8. When one of the turning rods 851 of the third conveying unit 85 is at the first rod transverse position, the one of the turning rods 851 sucks the second surfaces (A12) of one of the columns of the blank bodies (A1) (i.e., the one of the turning rods 851 sucks the blank bodies (A1) m at a time) that are conveyed by the first conveyor 81 via the airflow generated by the turning suction members 852 thereof.

Afterwards, the one of the turning rods 851 is rotated toward the first rod longitudinal position while carrying the one of the columns of the blank bodies (A1). When the one of the turning rods 851 is located at the first rod longitudinal position, the first camera unit 61 of the inspection device 6 is moved in the longitudinal direction (X), and the first camera unit 61 captures the images of the first surfaces (A11) of the blank bodies (A1) that are respectively sucked by the turning suction members 852 of the one of the turning rods 851 and generates the inspection data accordingly during the movement. At this time, the controller 93 determines whether each of the blank bodies (A1) is defective according to the inspection datum of the first surface (A11) of each of the blank bodies (A1). If the inspection datum of the first surface (A11) of one of the blank bodies (A1) shows that the first surface (A11) of the one of the blank bodies (A1) has no less than 1 percent defective area, the one of the blank bodies (A1) is determined to be defective. If the inspection datum of the first surface (A11) of one of the blank bodies (A1) shows that the first surface (A11) of the one of the blank bodies (A1) has less than 1 percent defective area, the one of the blank bodies (A1) is determined to be accepted.

Then, the one of the turning rods 851 is rotated toward the second rod transverse position while carrying the one of the columns of the blank bodies (A1). When the one of the turning rods 851 is located at the second rod transverse position, and when one of the blank bodies (A1) carried by the one of the turning rods 851 is determined to be defective, the controller 93 controls the pushing rod 912 of the respective one of the hydraulic cylinders 911 of the first removing unit 91 to push the one of the blank bodies (A1) away from the respective one of the turning suction members 852 of the one of the turning rods 851, so the one of the blank bodies (A1) is removed from the blank conveying path.

When the one of the turning rods 851 is rotated to be at the second rod longitudinal position, the airflow generated by the turning suction members 852 thereof are ceased so as to release the blank bodies (A1), which have been determined to be accepted, onto the second conveyor 84 of the conveying device 8 in the manner that the released blank bodies (A1) are arranged in the row in the longitudinal direction (X). Then, the released blank bodies (A1) are conveyed by the second conveyor 84 in the longitudinal direction (X).

When the blank bodies (A1) are conveyed across the inspection area of the second camera units 62 of the inspection device 6, the second camera units 62 capture the images of the second surface (A12) of each of the blank bodies (A1) from different angles to acquire the inspection data of the second surface (A12) of each of the blank body (A1). Since in this embodiment, the inspection device 6 includes five second camera units 62, for the second surface (A12) of each of the blank body (A1), five sets of inspection data are acquired. At this time, the controller 93 once again determines whether each of the blank bodies (A1), which have been determined to be accepted, is defective according to the inspection data of the second surface (A12) of each of the blank bodies (A1). If the inspection data of the second surface (A12) of one of the blank bodies (A1) show that the second surface (A12) of the one of the blank bodies (A1) has no less than 1 percent defective area, the one of the blank bodies (A1) is determined to be defective. If the inspection data of the second surface (A12) of one of the blank bodies (A1) show that the second surface (A12) of the one of the blank bodies (A1) has less than 1 percent defective area, the one of the blank bodies (A1) is determined to be accepted.

When one of the blank bodies (A1) is determined to be defective and is conveyed past the inspection area of the second camera units 62, the controller 93 controls the second removing unit 92 to generate the airflow to push the one of the blank bodies (A1) away from the second conveyor 84, so the one of the blank bodies (A1) is removed from the blank conveying path.

When the blank bodies (A1), which have been determined to be accepted twice by the controller 93, are conveyed to the end of the blank conveying path by the second conveyor 84, the airflow-generating subunit 864 of the fourth conveying unit 86 of the conveying device 8 generates the airflow to urge each of the blank bodies (A1) to enter the hollow tube 861 of the fourth conveying unit 86 through the inlet opening 862 of the hollow tube 861 and to exit the hollow tube 861 through the outlet opening 863 of the hollow tube 861 with the airflow. By virtue of the hollow tube 861 being U-shaped, the blank bodies (A1) are overturned after traveling through the hollow tube 861 and are stacked one above another. Specifically, the orientation arm subunit 771 of the orientation unit 77 of the packaging device 7 orients the blank body entering opening 761 of the packaging tube 76 to the outlet opening 863 of the hollow tube 861, so the blank bodies (A1) enter the stacking space 760 of the packaging tube 76 through the blank body entering opening 761 of the packaging tube 76 after exiting the outlet opening 863 of the hollow tube 861 and are stacked one above another in the stacking space 760 of the packaging tube 76 (i.e., the stacking space 760 of the packaging tube 76 accommodates the stacked blank bodies (A1) that travel through the hollow tube 861).

Next, the orientation arm subunit 771 of the orientation unit 77 orients the blank body exiting opening 762 of the packaging tube 76 to the packaging space 71 of the packaging device 7, and the stack pushing rod 781 of the pushing unit 78 enters the stacking space 760 of the packaging tube 76 through the blank body entering opening 761 of the packaging tube 76 to push the stacked blank bodies (A1) so that the stacked blank bodies (A1) are urged to exit the stacking space 760 through the blank body exiting opening 762 and enter the packaging bag (B) that is in the packaging space 71 through the open end (B2) of the packaging bag (B). Specifically, before the stacked blank bodies (A1) enter the packaging bag (B), the holding units 74 of the packaging device 7 cooperatively hold the open end (B2) of the packaging bag (B) and are at the second bag position so that the open end (B2) and the closed end (B1) thereof are distal from each other and the stacked blank bodies (A1) that travel through the hollow tube 861 of the fourth conveying unit 86 are allowed to enter the packaging bag (B) through the open end (B2) of the packaging bag (B).

After the stacked blank bodies (A1) enter the packaging bag (B), the heat pressing subunits 791 of the packaging unit 79 of the packaging device 7 cooperatively heat press the open end (B2) of the packaging bag (B) to close the open end (B2).

Consequently, the molding system completes the whole pulp molding process for making paper products by automatically performing different functions sequentially (i.e., the functions of scooping the slurry, hot pressing the blank unit (A), demolding the blank unit (A), cutting the blank unit (A), overturning the blank bodies (A1), conveying the blank bodies (A1) in a required array, inspecting the blank bodies (A1), stacking the blank bodies (A1) and packaging the blank bodies (A1)). When the blank bodies (A1) are packaged in the packaging bag (B) whose open end (B2) is closed, the packaging bag (B) can be taken out from the packaging space 71 of the packaging device 7. After the packaging bag (B) is taken out from the packaging space 71, another packaging bag can be placed in the packaging space 71. When another packaging bag is placed in the packaging space 71 and when the holding units 74 are at the first bag position, the restraining unit 73 restrains a closed end of another packaging bag from moving, and the holding units 74 cooperatively hold an open end of another packaging bag. Then, the holding units 74 are moved along the pulling rods 72 of the packaging device 7 to be at the second bag position, so the packaging bag is extended from the one of the opposite ends of each of the pulling rods 72 to the other one of the opposite ends of the pulling rod 72. At this time, blank bodies that are produced through another cycle of the pulp molding process and that are stacked are allowed to enter another packaging bag through the open end of another packaging bag.

Figure 13:
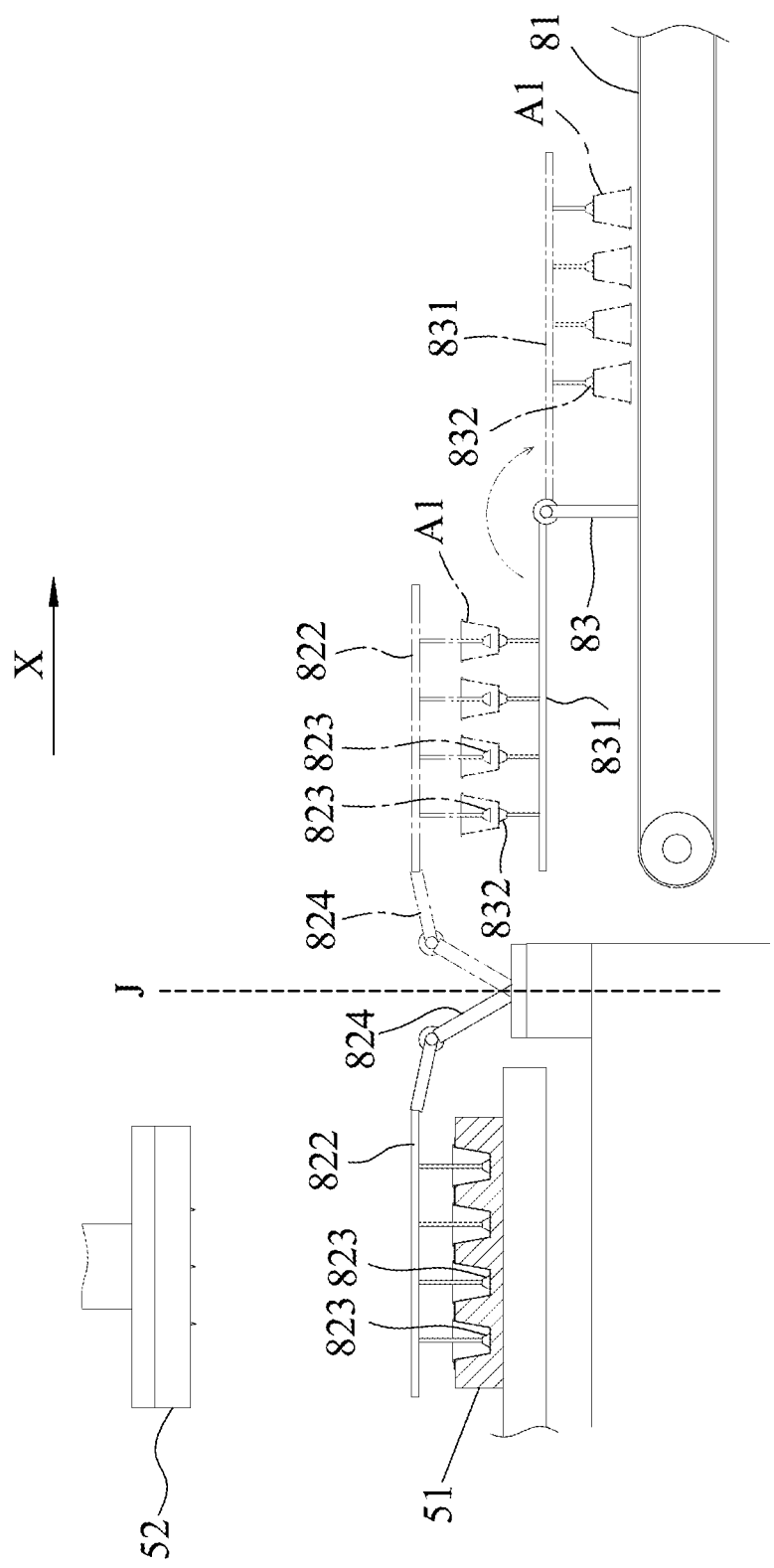
FIG. 13 illustrates a modification of the first conveying unit.

It is noted that, the first conveying unit 82 may not be limited to be designed to include the conveying rack 821 and the separating suction rack 822. Referring to FIG. 13, a modification of the first conveying unit 82 includes a robot arm 824 and a separating suction rack 822. The robot arm 824 is operable to rotate about a second imaginary axis (J) that extends in the up-down direction (Z). The separating suction rack 822 is connected to the robot arm 824 and is co-rotatable with the robot arm 824. Specifically, the robot arm 824 is rotatable about the second imaginary axis (J) between a first arm position, at which the separating suction rack 822 is distal from the first conveyor 81 of the conveying device 8, and a second arm position, at which the robot arm 824 is turned 180 degrees about the second imaginary axis (J) from the first arm position, and at which the separating suction rack 822 is proximate to the first conveyor 81. The modification of the separating suction rack 822 includes a plurality of separating suction members 823 each of which has a structure that is the same as that of each of the separating suction members 823 in this embodiment. For the modification of the first conveying unit 82, when the first conveying unit 82 is in the carrying state, the robot arm 824 is at the first arm position and each of the separating suction members 823 is adapted to suck the first surface (A11) of a respective one of the blank bodies (A1) via the airflow such that the blank bodies (A1) are separated from the first cutting mold 51 of the cutting device 5. When the first conveying unit 82 is in the releasing state, the robot arm 824 is at the releasing position and each of the separating suction members 823 is operable to cease the airflow such that the blank bodies (A1) are released. When the overturning suction rack 831 of the second conveying unit 83 is at the first rotating position and when the robot arm 824 is at the second arm position, the overturning suction rack 831 is proximate to the robot arm 824 and is spaced apart from the separating suction rack 822 in the up-down direction (Z), such that each of the overturning suction members 832 faces the separating suction rack 822 and is adapted to suck the second surface (A12) of the respective one of the blank bodies (A1) via the airflow when the blank bodies (A1) are released from the separating suction members 823. When the overturning suction rack 831 is at the second rotating position, the overturning suction rack 831 is distal from the robot arm 824 that is at the second arm position, and each of the overturning suction members 832 sucks and moves the respective one of the blank bodies (A1) to face the first conveyor 81 of the conveying device 8, and is operable to cease the airflow such that the blank bodies (A1) are released onto the first conveyor 81 in the manner that overturns the blank bodies (A1). The robot arm 824 may occupy less space and swiftly rotate between the first arm position and the second arm position, which optimizes the use of the space in the molding system and saves time for the pulp molding process.

Figure 14:
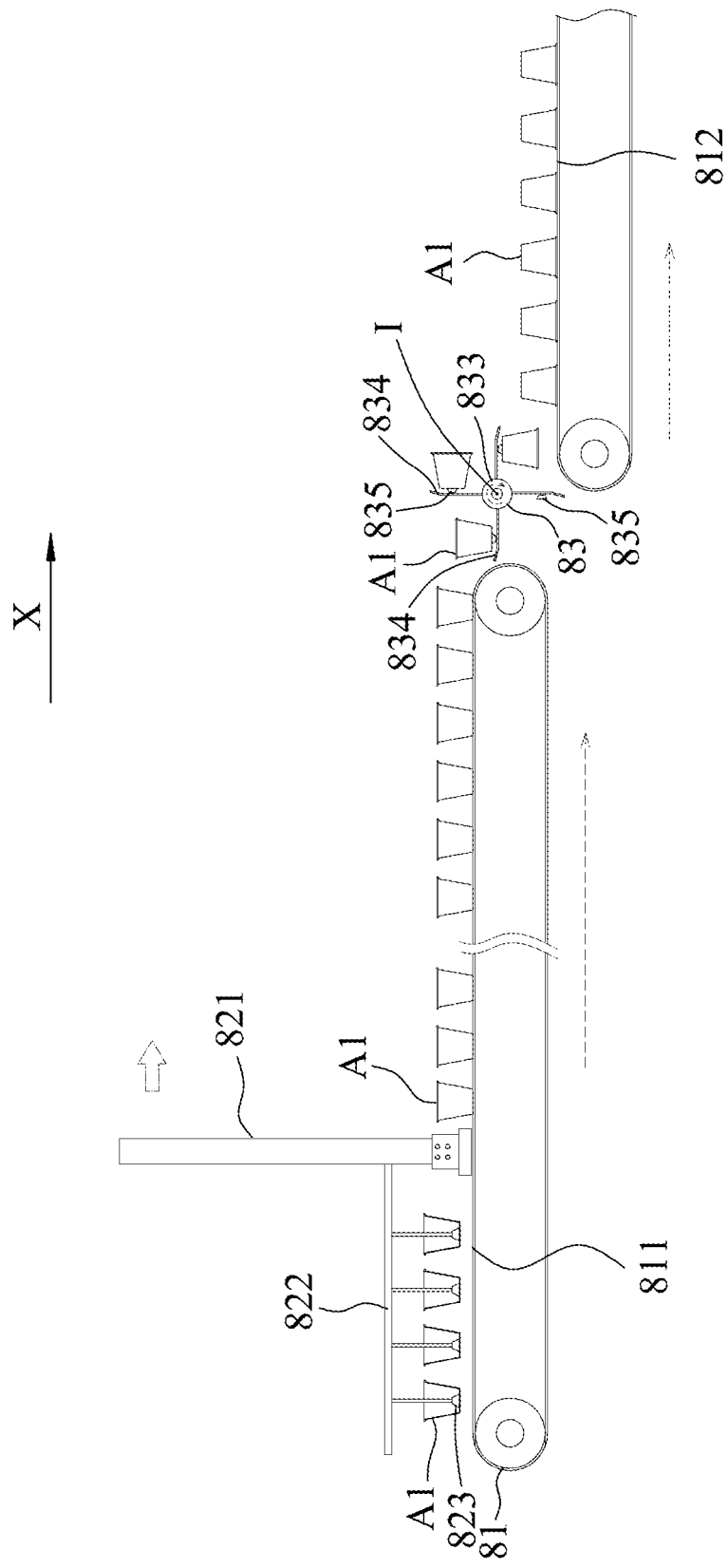
FIG. 14 illustrates a modification of the second conveying unit.
Figure 15:
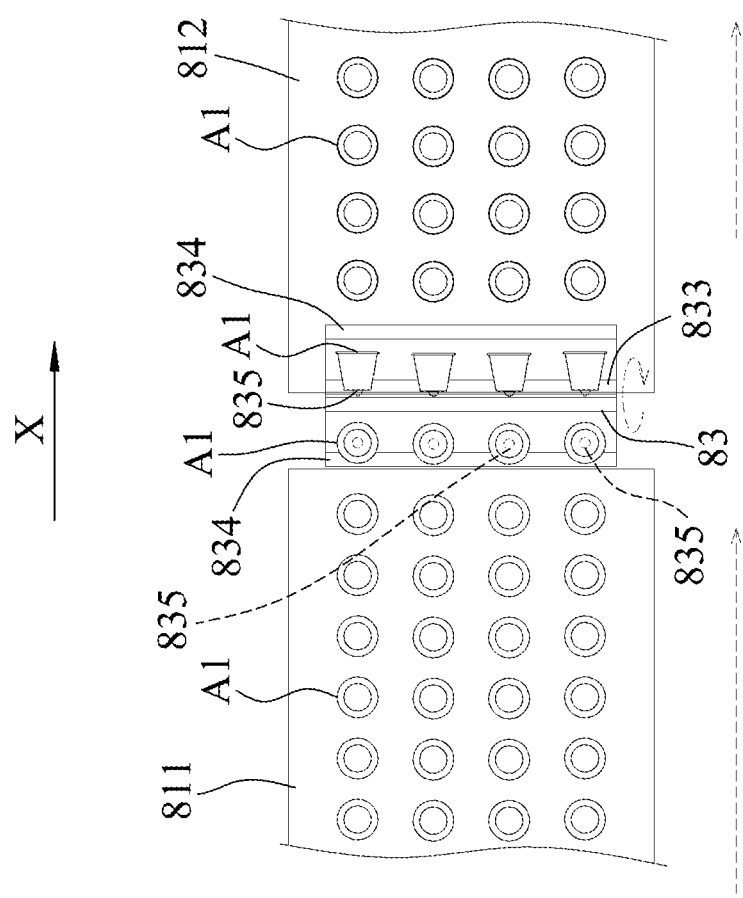
FIG. 15 is a fragmentary top view illustrating the modification of the second conveying unit overturning the blank bodies.

Referring to FIGS. 14 and 15, a modification of the first conveyor 81 and a modification of the second conveying unit 83 provide another means of overturning each of the blank bodies (A1) before the blank bodies (A1) are conveyed by the third conveying unit 85 of the conveying device 8. The first conveyor 81 is adapted to convey the blank bodies (A1) that are released from the separating suction rack 822 of the first conveying unit 82, and includes a first conveying section 811 and a second conveying section 812 that are spaced apart from each other in the longitudinal direction (X). The second conveying unit 83 is rotatably mounted to the frame, and is located between the first conveying section 811 and the second conveying section 812 of the first conveyor 81. The first conveying section 811 of the first conveyor 81 is adapted to convey the blank bodies (A1) toward the second conveying unit 83, and the second conveying section 812 of the first conveyor 81 is adapted to convey the blank bodies (A1) away from the second conveying unit 83. The second conveying unit has a surrounding surface 833 and a plurality of rotating plates 834. The surrounding surface 833 surrounds a third imaginary axis (I) that extends in the transverse direction (Y). Each of the rotating plates 834 protrudes from the surrounding surface 833, and includes m rotating suction members 835 that are arranged in the transverse direction (Y). Each of the rotating suction members 835 is operable to generate an airflow. The second conveying unit 83 is rotatable about the third imaginary axis (I) such that each of the rotating plates 834 is rotatable about the first imaginary axis (I) between a first plate position, at which the rotating plate 834 is adjacent to the first conveying section 811 of the first conveyor 81 and is adapted to carry the blank bodies (A1) that are conveyed by the first conveying section 811, and a second plate position, at which the rotating plate 834 is rotated 180 degrees about the third imaginary axis (I), is adjacent to the second conveying section 812 of the first conveyor 81, and is adapted to release the blank bodies (A1) onto the second conveying section 812 in a manner that overturns the blank bodies (A1). Specifically, a distal portion of each of the rotating plates 834 is bent such that when the rotating plate 834 is at the first plate position and the blank bodies (A1) are conveyed to the rotating plate 834, the blank bodies (A1) are urged to be respectively located on the rotating suction members 835 and respectively sucked by the rotating suction members 835 via the airflow. When one of the rotating plates 834 is at the second plate position, the airflows generated by the rotating suction members 835 of the one of the rotating plates 834 are ceased so as to release the blank bodies (A1) onto the second conveying section 812 of the first conveyor 81. The modification of the second conveying unit 83 may occupy less space, which optimizes the use of the space in the molding system.

Figure 16:
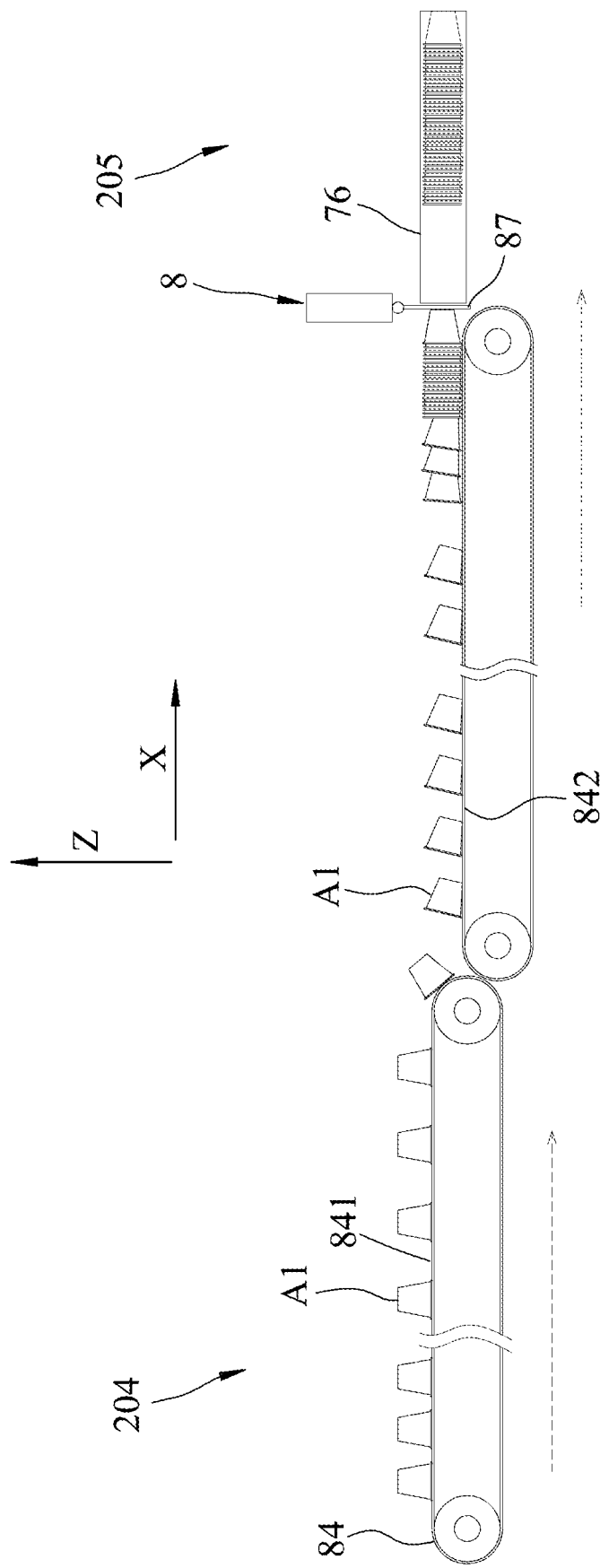
FIG. 16 illustrates a blocking plate of a conveying device of the embodiment in a blocking state.

Referring to FIG. 16, a modification of the conveying device 8 provides another means of stacking the blank bodies (A1). In this modification, the conveying device 8 further includes a blocking plate 87, and the second conveyor 84 includes a first carrying section 841 and a second carrying section 842. Furthermore, in this modification, the fourth conveying unit 86 is omitted. The first carrying section 841 is disposed at the inspection zone 204, has two opposite ends that are respectively distal from and proximate to the packaging zone 205 of the frame device 2, and is adapted to carry and convey each of the columns of the blank bodies (A1) conveyed by the third conveying unit 85 of the conveying device 8. The second carrying section 842 extends from one of the ends of the first carrying section 842 that is proximate to the packaging zone 205 to the packaging zone 205, is adapted to carry the blank bodies (A1) conveyed by the first carrying section 841 and convey the blank bodies (A1) to the packaging zone 205, and is located below a top surface of the first carrying section 841 in the up-down direction (Z) so that when the blank bodies (A1) fall from the one of the ends of the first carrying section 841, the blank bodies (A1) topple onto the second carrying section 842 and are carried by the second carrying section 842. The blocking plate 87 is rotatably disposed on the frame, is located at one side of the second carrying section 842 opposite to the first carrying section 841 of the second conveyor 84, and is convertible between a blocking state, in which the blocking plate 87 is adapted to block the blank bodies' (A1) way to the packaging zone 205 by abutting against one of the blank bodies (A1) that is closest to the packaging zone 205 so that the blank bodies (A1) are stacked on the second carrying section 842 at one side of the blocking plate 87 opposite to the packaging zone 205 in the longitudinal direction (X), and an unblocking state, in which the blocking plate 87 is adapted to be separated from the one of the blank bodies (A1) that is closest to the packaging zone 205 so that the stacked blank bodies (A1) are allowed to be conveyed by the second carrying section 842 to enter the packaging zone 205. In this embodiment, when the blocking plate 87 is in the blocking state, the orientation arm subunit 771 of the orientation unit 77 is operable to orient the blank body entering opening 761 of the packaging tube 76 to the blocking plate 87 so that the stacked blank bodies (A1) enter the stacking space 760 of the packaging tube 76 through the blank body entering opening 761 of the packaging tube 76 after the blocking plate 87 is switched into the unblocking state (i.e., the stacking space 760 of the packaging tube 76 accommodates the stacked blank bodies (A1) that are conveyed thereinto by the second carrying section 842 of the second conveyor 84). Before the stacked blank bodies (A1) enter the packaging bag (B), the holding units 74 of the packaging device 7 cooperatively hold the open end (B2) of the packaging bag (B) and are at the second bag position so that the stacked blank bodies (A1) that are accommodated in the stacking space 760 of the packaging tube 76 are allowed to enter the packaging bag (B) through the open end (B2) of the packaging bag (B). By virtue of the conveying device 8 including the blocking plate 87, the blank bodies (A1) are stacked in the longitudinal direction (X) in a relatively simple means.

Figure 17:
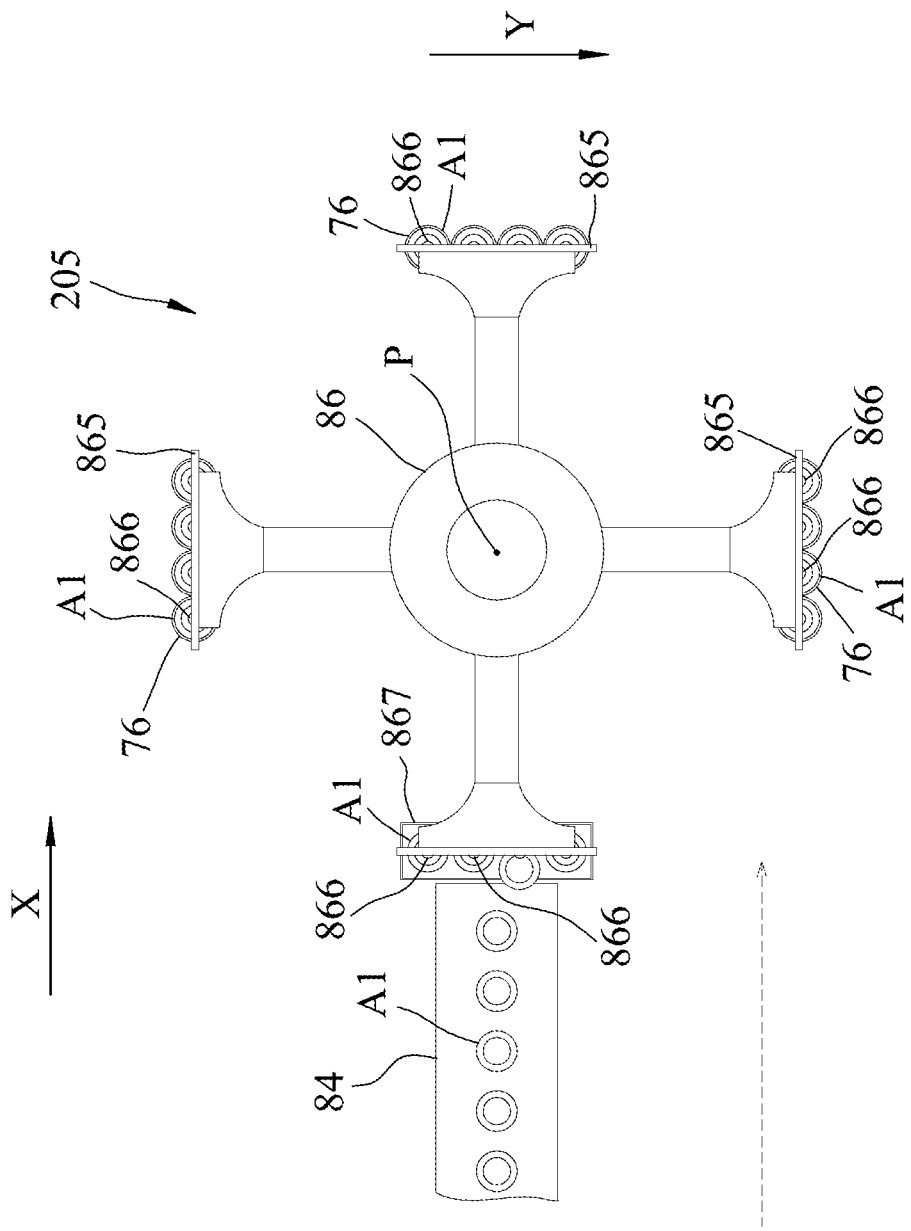
FIG. 17 is a fragmentary top view of a modification of a fourth conveying unit.
Figure 18:
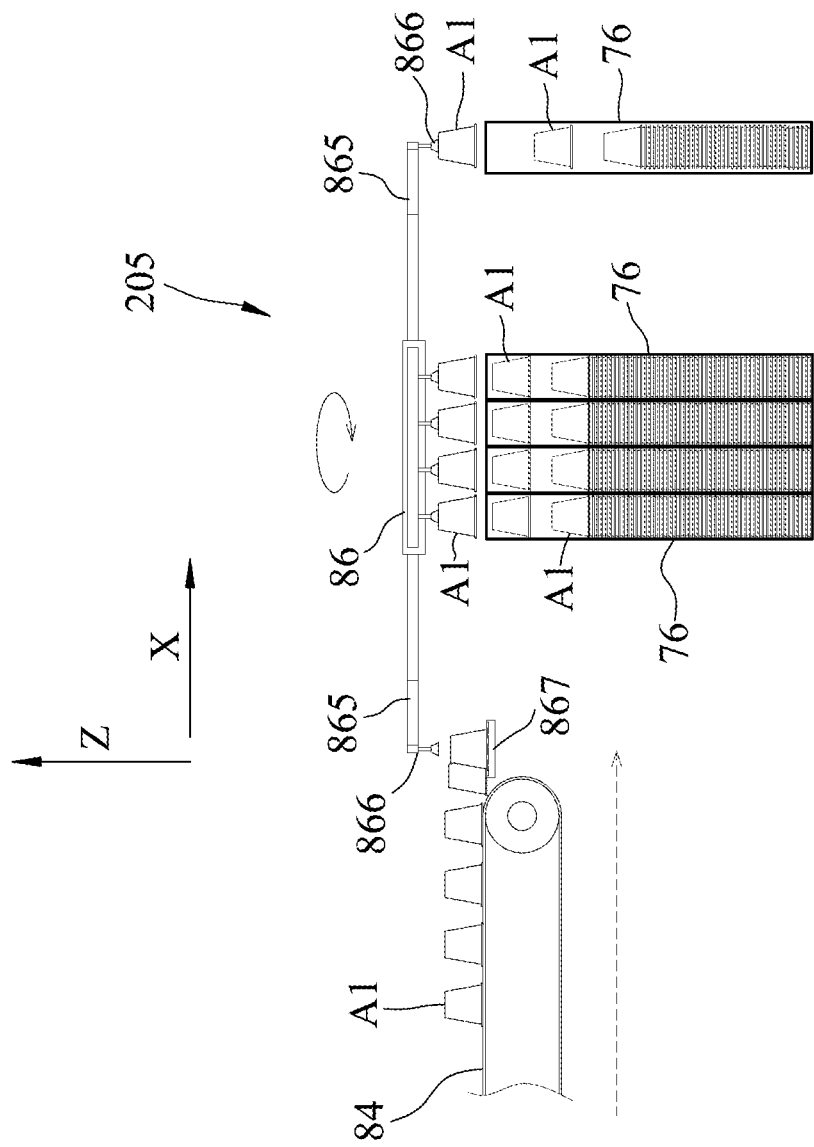
FIG. 18 illustrates the blank bodies stacked one above another after released by the modification of the fourth conveying unit.

Referring to FIGS. 17 and 18, a modification of the fourth conveying unit 86 provides still another means of stacking the blank bodies (A1). In this modification, the fourth conveying unit 86 is disposed at the packaging zone 205 of the frame device 2, is adjacent to the second conveyor 84, and includes a plurality of stacking rods 865 and a carrying plate 867. The carrying plate 867 is located at one end of the second conveyor 84 opposite to the inspection zone 204 of the frame device 2, and is adapted to carry the blank bodies (A1) that are conveyed by the second conveyor 84. A length of the carrying plate 867 in the longitudinal direction (X) is substantially equal to the length of each of the blank bodies (A1) in the longitudinal direction (X), and a width of the carrying plate 867 in the transverse direction (Y) is substantially equal to k times the width of each of the blank bodies (A1) in the transverse direction (Y) so that the second conveyor 84 conveys the blank bodies (A1) onto the carrying plate 867 k at a time and in a manner that rearranges the k blank bodies (A1) in the transverse direction (Y). k is a positive integer. In one embodiment, k equals m. The stacking rods 865 are angularly spaced apart from each other about a fourth imaginary axis (P) extending in the up-down direction (Z). Each of the stacking rods 865 includes k stacking suction members 866 that are arranged perpendicularly to the fourth imaginary axis (P), and is rotatable about the fourth imaginary axis (P) between a plate facing position and at least one stacking position. In this embodiment, each of the stacking rods 865 is rotatable about the fourth imaginary axis (P) among the plate facing position and three stacking positions. Each of the stacking suction members 866 is operable to generate an airflow. When one of the stacking rods 865 is at the plate facing position, the stacking suction members 866 of the one of the stacking rods 865 are in a transverse arrangement, face the carrying plate 867, and correspond in position to the blank bodies (A1) that are carried by the carrying plate 867 so as to be adapted to respectively suck the blank bodies (A1) via the airflow. When the one of the stacking rods 865 is rotated from the plate facing position to one of the stacking positions, the airflows that are generated by the stacking suction members 866 of the stacking rod 865 are ceased so that the blank bodies (A1) are released. When another one of the stacking rods 865 is rotated from the plate facing position to the one of the stacking positions, the airflows that are generated by the stacking suction members 866 of the another one of the stacking rods 865 are ceased so that the blank bodies (A1) sucked by the another one of the stacking rods 865 are released on the blank bodies (A1) that are released by the one of the stacking rods 865. Consequently, at each of the stacking positions, by virtue of each of the stacking rods 865 including k stacking suction members 866, the blank bodies (A1) are stacked one above another and are arranged in k piles. Specifically, in cooperation with the modification, the packaging device 7 includes a plurality of the packaging tubes 76. The stacking space 760 of each of the packaging tubes 76 is adapted to accommodate the blank bodies (A1) released by the fourth conveying unit 86 (i.e., the blank bodies (A1) are released into the stacking spaces 760 through the blank body entering openings 761 by the fourth conveying unit 86). A plurality of the packaging devices 7 may be needed for cooperation with the modification of the fourth conveying unit 86. For each of the packaging devices 7, when the holding units 74 are at the second bag position, the blank bodies (A1) accommodated in the stacking space 760 of one of the packaging tubes 76 are allowed to enter the packaging bag (B) through the open end (B2) of the packaging bag (B). The modification of the fourth conveying unit 86 may save time for the pulp molding process.

According to the abovementioned description, benefits of this embodiment can be sorted out and listed as below:
  a) The molding system according to the disclosure completes the whole pulp molding process cycle for making paper products by automatically performing different functions sequentially, which saves time and manpower.
  b) By virtue of the airflows that are generated by the channels 411 of the first mold 41 pushing the blank unit (A) away, and by virtue of the airflows that are generated by the channels 431 of the second mold 43 sucking the blank unit (A) at the same time, the blank unit (A) is well demolded (i.e., the blank unit (A) may not be damaged), and may be smoothly demolded from the first mold 41. Consequently, the defect rate of the blank unit (A) may be greatly reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A molding system adapted for use with a slurry, said molding system comprising:
  a frame device defining a scooping zone, a hot pressing zone, a cutting zone, an inspection zone and a packaging zone;
  a scooping device disposed at said scooping zone and including a pulp tank that is adapted to contain the slurry, and a scooping mold that is adapted to scoop the slurry such that the slurry forms a blank unit thereon;

a demolding device including
- a first mold that is operable to move back and forth between said scooping zone and said hot pressing zone,
- a hot pressing mold that is disposed at said hot pressing zone, and
- a second mold that is disposed at a boundary between said hot pressing zone and said cutting zone, said first mold being adapted to suck the blank unit so that the blank unit is demolded from said scooping mold, being adapted to convey the blank unit from said scooping mold to said hot pressing mold such that the blank unit is heated and compressed between said first mold and said hot pressing mold to form in a shape of said first mold, and being adapted to convey the blank unit from said hot pressing mold to said second mold, one of said first mold and said second mold being operable to move relative to the other one of said first mold and said second mold, when the one of said first mold and said second mold moving away from the other one of said first mold and said second mold, said first mold being operable to generate an airflow to push the blank unit away and said second mold being adapted to suck the blank unit so that the blank unit is demolded from said first mold;

a cutting device disposed at said cutting zone and adapted to cut the blank unit into a plurality of blank bodies;

an inspection device disposed at said inspection zone and adapted to inspect each of the blank bodies so as to generate at least one inspection datum accordingly;

a packaging device disposed at said packaging zone and adapted to wrap the blank bodies in a packaging bag; and a conveying device disposed at said frame device and adapted to convey the blank bodies from said cutting zone to said packaging zone through said inspection zone.

2. The molding system as claimed in claim 1, wherein:
said scooping zone, said hot pressing zone, said cutting zone, said inspection zone and said packaging zone of said frame device are sequentially arranged in a longitudinal direction;
said frame device includes at least one mold rail that extends from said scooping zone to said cutting zone in the longitudinal direction; and
said first mold of said demolding device is slidably mounted to said at least one mold rail.

3. The molding system as claimed in claim 2, wherein:
said demolding device further includes a demolding suction carrier that is operable to move back and forth between said hot pressing zone and said cutting zone of said frame device, and that includes a plurality of demolding suction members; and
when the blank unit is located on said second mold, each of said demolding suction members is operable to generate an airflow to suck the blank unit so that the blank unit is demolded from said second mold and carried by said demolding suction carrier, is operable to convey the blank unit to said cutting device, and is operable to cease the airflow to release the blank unit onto said cutting device.

4. The molding system as claimed in claim 1, wherein:
said cutting device includes a first cutting mold and a second cutting mold that are spaced apart from each other in an up-down direction;
said first cutting mold is adapted to support the blank unit;
one of said first cutting mold and said second cutting mold is movable relative to the other one of said first cutting mold and said second cutting mold to be separably coupled to the other one of said first cutting mold and said second cutting mold; and
when said first cutting mold and said second cutting mold are coupled to each other after the blank unit is placed on said first cutting mold, the blank unit is cut into the blank bodies.

5. The molding system as claimed in claim 4, wherein said conveying device includes
a first conveyor that extends from said cutting zone to said inspection zone of said frame device in a longitudinal direction perpendicular to the up-down direction, and
a first conveying unit that is convertible between a carrying state, in which said first conveying unit is operable to generate an airflow to suck the blank bodies such that the blank bodies are separated from said first cutting mold, and a releasing state, in which said first conveying unit is operable to cease the airflow such that the blank bodies are released.

6. The molding system as claimed in claim 5, wherein:
said frame device includes two rack rails that are spaced apart from each other in a transverse direction perpendicular to the longitudinal direction and the up-down direction, and that extend from said hot pressing zone to said inspection zone in the longitudinal direction;
said first conveying unit includes
a conveying rack that extends in the up-down direction, and that is slidable along said rack rails in the longitudinal direction between a carrying position, at which said conveying rack is distal from said first conveyor of said conveying device, and a releasing position, at which said conveying rack is proximate to said first conveyor, and
a separating suction rack that is slidably mounted to said conveying rack so that said separating suction rack is slidable along said conveying rack in the up-down direction and is co-movable with said conveying rack in the longitudinal direction;
said separating suction rack includes a plurality of separating suction members that are operable to generate an airflow, and that are arranged in an array with m rows in the transverse direction by n columns in the longitudinal direction, each of m and n being a positive integer;
when said first conveying unit is in the carrying state, said conveying rack is at the carrying position and each of said separating suction members is adapted to suck a first surface of a respective one of the blank bodies via the airflow such that the blank bodies are separated from said first cutting mold of said cutting device; and
when said first conveying unit is in the releasing state, said conveying rack is at the releasing position and each of said separating suction members is operable to cease the airflow such that the blank bodies are released.

7. The molding system as claimed in claim 6, wherein:
said conveying device further includes a second conveying unit that includes an overturning suction rack rotatably mounted to said frame device and including a plurality of overturning suction members, said overturning suction members being operable to generate an airflow and being arranged in an array the same as that of said separating suction members;

said overturning suction rack is rotatable relative to said frame device between a first rotating position and a second rotating position;

when said overturning suction rack is at the first rotating position and when said conveying rack of said conveying device is at the releasing position, said overturning suction rack is proximate to said conveying rack and is spaced apart from said separating suction rack of said conveying device in the up-down direction, such that each of said overturning suction members faces said separating suction rack and is adapted to suck a second surface of a respective one of the blank bodies via the airflow when the blank bodies are released from said separating suction members;

when said overturning suction rack is at the second rotating position, said overturning suction rack is distal from said conveying rack that is at the releasing position, and each of said overturning suction members sucks and moves the respective one of the blank bodies to face said first conveyor of said conveying device, and is operable to cease the airflow such that the blank bodies are released onto said first conveyor in a manner that overturns the blank bodies.

8. The molding system as claimed in claim 7, wherein:
each of said demolding suction members has a diameter that ranges from 10 to 40 millimeters, and is operable to exert a suction force that ranges from 3.5 to 94 newtons on the blank unit;
each of said separating suction members has a diameter that ranges from 10 to 40 millimeters, and is operable to exert a suction force that ranges from 3.5 to 94 newtons on the respective one of the blank bodies; and
each of said overturning suction members has a diameter that ranges from 10 to 40 millimeters, and is operable to exert a suction force that ranges from 3.5 to 94 newtons on the respective one of the blank bodies.

9. The molding system as claimed in claim 6, wherein:
said first conveyor of said conveying device is adapted to convey the blank bodies that are released from said separating suction rack of said first conveying unit, and includes a first conveying section and a second conveying section that are spaced apart from each other in the longitudinal direction;
said conveying device further includes a second conveying unit that is rotatably mounted to said frame device, that is located between said first conveying section and said second conveying section, and that has a surrounding surface surrounding a first imaginary axis that extends in the transverse direction, and a plurality of rotating plates each of which protrudes from said surrounding surface;
said first conveying section of said first conveyor is adapted to convey the blank bodies toward said second conveying unit, and said second conveying section of said first conveyor is adapted to convey the blank bodies away from said second conveying unit;
said second conveying unit is rotatable about the first imaginary axis such that each of said rotating plates is rotatable about the first imaginary axis between a first plate position, at which said rotating plate is adjacent to said first conveying section and is adapted to carry the blank bodies that are conveyed by said first conveying section, and a second plate position, at which said rotating plate is rotated 180 degrees about the first imaginary axis, is adjacent to said second conveying section, and is adapted to release the blank bodies onto said second conveying section in a manner that overturns the blank bodies.

10. The molding system as claimed in claim 9, wherein:
each of said rotating plates of said second conveying unit includes m rotating suction members that are arranged in the transverse direction, each of said rotating suction members being operable to generate an airflow; and
a distal portion of each of said rotating plates is bent such that when said rotating plate is at the first plate position and the blank bodies are conveyed to said rotating plate, the blank bodies are urged to be respectively located on the rotating suction members and respectively sucked by the rotating suction members via the airflow.

11. The molding system as claimed in claim 5, wherein:
said first conveying unit includes a robot arm that is operable to rotate about a second imaginary axis extending in the up-down direction, and a separating suction rack connected to said robot arm and co-rotatable with said robot arm;
said robot arm is rotatable about the second imaginary axis between a first arm position, at which said separating suction rack is distal from said first conveyor of said conveying device, and a second arm position, at which said robot arm is turned 180 degrees about the second imaginary axis from the first arm position, and at which said separating suction rack is proximate to said first conveyor;
said separating suction rack includes a plurality of separating suction members that are operable to generate an airflow, and that are arranged in an array with m rows in a transverse direction perpendicular to the longitudinal direction and the up-down direction, by n columns in the longitudinal direction, each of m and n being a positive integer;
when said first conveying unit is in the carrying state, said robot arm is at the first arm position and each of said separating suction members is adapted to suck a first surface of a respective one of the blank bodies via the airflow such that the blank bodies are separated from said first cutting mold of said cutting device; and
when said first conveying unit is in the releasing state, said robot arm is at the releasing position and each of said separating suction members is operable to cease the airflow such that the blank bodies are released.

12. The molding system as claimed in claim 11, wherein:
said conveying device further includes a second conveying unit that includes an overturning suction rack rotatably mounted to said frame device and including a plurality of overturning suction members, said overturning suction members being operable to generate an airflow and being arranged in an array the same as that of said separating suction members;
said overturning suction rack is rotatable relative to said frame device between a first rotating position and a second rotating position;
when said overturning suction rack is at the first rotating position and when said robot arm of said conveying device is at the second arm position, said overturning suction rack is proximate to said robot arm and is spaced apart from said separating suction rack of said conveying device in the up-down direction, such that each of said overturning suction members faces said separating suction rack and is adapted to suck a second surface of a respective one of the blank bodies via the airflow when the blank bodies are released from said separating suction members;

when said overturning suction rack is at the second rotating position, said overturning suction rack is distal from said robot arm that is at the second arm position, and each of said overturning suction members sucks and moves the respective one of the blank bodies to face said first conveyor of said conveying device, and is operable to cease the airflow such that the blank bodies are released onto said first conveyor in a manner that overturns the blank bodies.

13. The molding system as claimed in claim 7, wherein:
each of said demolding suction members has a diameter that ranges from 10 to 40 millimeters, and is operable to exert a suction force that ranges from 3.5 to 94 newtons on the blank unit;
each of said separating suction members has a diameter that ranges from 10 to 40 millimeters, and is operable to exert a suction force that ranges from 3.5 to 94 newtons on the respective one of the blank bodies; and
each of said overturning suction members has a diameter that ranges from 10 to 40 millimeters, and is operable to exert a suction force that ranges from 3.5 to 94 newtons on the respective one of the blank bodies.

14. The molding system as claimed in claim 11, wherein:
said first conveyor of said conveying device is adapted to convey the blank bodies that are released from said separating suction rack of said first conveying unit, and includes a first conveying section and a second conveying section that are spaced apart from each other in the longitudinal direction;
said conveying device further includes a second conveying unit that is rotatably mounted to said frame device, that is located between said first conveying section and said second conveying section, and that has a surrounding surface surrounding a first imaginary axis that extends in the transverse direction, and a plurality of rotating plates each of which protrudes from said surrounding surface;
said first conveying section of said first conveyor is adapted to convey the blank bodies toward said second conveying unit, and said second conveying section of said first conveyor is adapted to convey the blank bodies away from said second conveying unit;
said second conveying unit is rotatable about the first imaginary axis such that each of said rotating plates is rotatable about the first imaginary axis between a first plate position, at which said rotating plate is adjacent to said first conveying section and is adapted to carry the blank bodies that are conveyed by said first conveying section, and a second plate position, at which said rotating plate is rotated 180 degrees about the first imaginary axis, is adjacent to said second conveying section, and is adapted to release the blank bodies onto said second conveying section in a manner that overturns the blank bodies.

15. The molding system as claimed in claim 14, wherein:
each of said rotating plates of said second conveying unit includes m rotating suction members that are arranged in the transverse direction, each of said rotating suction members being operable to generate an airflow; and
a distal portion of each of said rotating plates is bent such that when said rotating plate is at the first plate position and the blank bodies are conveyed to said rotating plate, the blank bodies are urged to be respectively located on the rotating suction members and respectively sucked by the rotating suction members via the airflow.

16. The molding system as claimed in claim 5, wherein:
said conveying device defines a blank conveying path along which the blank bodies are conveyed;
said inspection device is adjacent to said blank conveying path, defines an inspection area, and is adapted to capture at least one image of each of the blank bodies so as to acquire the at least one inspection datum of the blank body;
said first conveying unit releases the blank bodies in a manner that arranges the blank bodies in a plurality of columns in the longitudinal direction such that the blank bodies are conveyed by said first conveyor of said conveying device in the same manner; and
said conveying device further includes
a second conveyor that partially defines said blank conveying path, that extends from said inspection zone to said packaging zone of said frame device in the longitudinal direction, and that is adapted to convey the blank bodies in the longitudinal direction across the inspection area, said inspection device being operable to capture the at least one image of each of the blank bodies when the blank bodies are conveyed across the inspection area by said second conveyor, and
a third conveying unit that is adapted to suck each column of the blank bodies conveyed by said first conveyor so as to convey the blank bodies from said first conveyor to said second conveyor in a manner that the arranges blank bodies in the longitudinal direction in a row.

17. The molding system as claimed in claim 16, wherein:
said third conveying unit is rotatable, partially defines said blank conveying path, is adjacent to said second conveyor, and includes a plurality of turning rods that are angularly spaced apart from each other about a third imaginary axis extending in the up-down direction;
said first conveying unit releases the blank bodies in a manner that arranges the blank bodies in an array with m rows in a transverse direction perpendicular to the longitudinal direction and the up-down direction by n columns in the longitudinal direction such that the blank bodies are conveyed by said first conveyor of said conveying device in the same manner, each of m and n being a positive integer;
each of said turning rods includes m turning suction members that are arranged perpendicularly to the third imaginary axis, and is rotatable about the third imaginary axis among a first rod transverse position, a first rod longitudinal position, a second rod transverse position and a second rod longitudinal position;
when one of said turning rods is at the first rod transverse position, said turning suction members of the one of said turning rods are in a transverse arrangement, face said first conveyor, and correspond in position to one of the columns of the blank bodies so as to be adapted to respectively suck the blank bodies in the one of the columns; and
when the one of said turning rods is rotated from the first rod transverse position to be at one of the first rod longitudinal position and the second rod longitudinal position, said turning suction members of said turning rod are in a longitudinal arrangement, face said second conveyor, and are adapted to release the one of the columns of the blank bodies onto said second conveyor in a manner that arranges the released blank bodies in the row in the longitudinal direction.

18. The molding system as claimed in claim 17, wherein:
when the one of said turning rods is at the second rod transverse position, said turning rod is spaced apart from said first conveyor, and said turning suction members of said turning rod are in a transverse arrangement;
when the one of said turning rods is at the second rod longitudinal position, said turning suction members are in the longitudinal arrangement and face said second conveyor; and
said inspection device includes
a first camera unit that is disposed on said frame device, that is operable to move in the longitudinal direction, that faces one of said turning rods which is at the first rod longitudinal position, and that is adapted to capture an image of the first surface of each of the blank bodies sucked by one of said turning rods at the first rod longitudinal position, and
a plurality of second camera units that are disposed on said frame device, that are adjacent to said second conveyor of said conveying device, and that are adapted to face each of the blank bodies conveyed across the inspection area by said second conveyor from different angles, each of said second camera units being adapted to capture an image of the second surface of each of the blank bodies conveyed across the inspection area by said second conveyor.

19. The molding system as claimed in claim 18, further includes a controlling device that is disposed on said frame device and that includes a first removing unit, a second removing unit and a controller; and
said controller is electrically coupled to said third conveying unit, said first camera unit, said second camera units, said first removing unit and said second removing unit, is adapted to determine whether each of the blank bodies is defective according to the at least one inspection datum of each of the blank bodies, and is operable to control at least one of said first removing unit and said second removing unit to remove one of the blank bodies from said blank conveying path when the one of blank bodies is determined to be defective by said controller.

20. The molding system as claimed in claim 19, wherein when the at least one inspection datum of one of the blank bodies shows that a surface area of the first surface of the one of the blank bodies has no less than 1 percent defective area, said controller is adapted to determine that the one of the blank bodies is defective.

21. The molding system as claimed in claim 19, wherein when the at least one inspection datum of one of the blank bodies shows that a surface area of the second surface of the one of the blank bodies has no less than 1 percent defective area, said controller is adapted to determine that the one of the blank bodies is defective.

22. The molding system as claimed in claim 19, wherein said first removing unit is configured to be a pushing rod that is adapted to push one of the blank bodies sucked by one of said turning rods of said third conveying unit away from the one of said turning rods so as to remove the one of the blank bodies from said blank conveying path.

23. The molding system as claimed in claim 19, wherein said second removing unit is configured to be a pushing rod that is adapted to push one of the blank bodies conveyed across the inspection area by said second conveyor of said conveying device away from said second conveyor so as to remove the one of the blank bodies from said blank conveying path.

24. The molding system as claimed in claim 19, wherein said second removing unit is configured to be a nozzle that is operable to generate an airflow, and that is adapted to push one of the blank bodies conveyed across the inspection area by said second conveyor of said conveying device away from said second conveyor via the airflow so as to remove the one of the blank bodies from said blank conveying path.

25. The molding system as claimed in claim 16, wherein:
said second conveyor of said conveying device includes
a first carrying section that is disposed at said inspection zone of said frame device, that has two opposite ends respectively distal from and proximate to said packaging zone of said frame device, and that is adapted to carry and convey each of the columns of the blank bodies conveyed by said third conveying unit of said conveying device, and
a second carrying section that extends from one of said ends of said first carrying section proximate to said packaging zone to said packaging zone, that is adapted to carry the blank bodies conveyed by said first carrying section and convey the blank bodies to said packaging zone, and that is located below a top surface of said first carrying section in the up-down direction so that when the blank bodies fall from the one of said ends of said first carrying section, the blank bodies topple onto said second carrying section and are carried by said second carrying section; and
said conveying device further includes a blocking plate that is rotatably disposed on said frame device, that is located at one side of said second carrying section opposite to said first carrying section, and that is convertible between a blocking state, in which said blocking plate is adapted to block the blank bodies' way to said packaging zone by abutting against one of the blank bodies that is closest to said packaging zone so that the blank bodies are stacked on said second carrying section at one side of said blocking plate opposite to said packaging zone in the longitudinal direction, and an unblocking state, in which said blocking plate is adapted to be separated from the one of the blank bodies that is closest to said packaging zone so that the stacked blank bodies are allowed to be conveyed by said second carrying section to enter said packaging zone.

26. The molding system as claimed in claim 25, wherein said packaging device includes
two pulling rods that are spaced apart from each other, each of said pulling rods having two opposite ends,
a restraining unit that is mounted to one of said opposite ends of each of said pulling rods, that cooperates with said pulling rods to define a packaging space opening at the other one of said opposite ends of each of said pulling rods and adapted to accommodate the packaging bag, and that is adapted to restrain a closed end of the packaging bag from moving, and
two holding units that are respectively and slidably mounted to said pulling rods, that are adapted to cooperatively and separably hold an open end of the packaging bag so that the open end of the packaging bag opens toward the other one of said opposite ends of each of said pulling rods, and that are slidable between a first bag position, at which said holding units are proximate to said restraining unit, and at which the open end and the closed end of the packaging bag are proximate to each other, and a second bag position, at which said holding units are distal from said restraining unit, and at which the packaging bag extends from the one of said opposite ends of each of said pulling rods to the other one of said opposite ends of said pulling rod so that the open end and the closed end thereof are distal from each other and the stacked blank bodies conveyed by said second carrying section of said conveying device are allowed to enter the packaging bag through the open end of the packaging bag.

27. The molding system as claimed in claim 26, wherein: said packaging device further includes
- a packaging tube that defines a stacking space, and that has a blank body entering opening and a blank body exiting opening opposite to said blank body entering opening, said stacking space communicating with the external environment through said blank body entering opening and said blank body exiting opening, and being adapted to accommodate the stacked blank bodies conveyed by said second carrying section of said conveying device before the stacked blank bodies enter the packaging bag through the open end of the packaging bag, said blank body entering opening being adapted for the stacked blank bodies to enter said stacking space, said blank body exiting opening being adapted for the stacked blank bodies to exit said stacking space,
- a pushing unit that includes a stack pushing rod operable to enter said stacking space through said blank body entering opening,
- an orientation unit that includes an orientation arm subunit disposed on said frame device, connected to said packaging tube, and operable to orient said blank body exiting opening of said packaging tube to said packaging space so that the stacked blank bodies enter the packaging bag after exiting said stacking space, and
- a packaging unit that includes two heat pressing subunits adapted to close the open end of the packaging bag by heat press, at least one of said heat pressing subunits being operable to move relative to another one of said heat pressing subunits to cooperatively heat press the open end of the packaging bag; and when the stacked blank bodies are conveyed into said stacking space through said blank body entering opening by said second carrying section, said stack pushing rod is adapted to push the stacked blank bodies so that the stacked blank bodies are urged to exit said stacking space through said blank body exiting opening and enter the packaging bag through the open end of the packaging bag.

28. The molding system as claimed in claim 16, wherein: said conveying device further includes a fourth conveying unit that is disposed at said packaging zone of said frame device, that is adjacent to said second conveyor, and that includes a plurality of stacking rods and a carrying plate;
said carrying plate is located at one end of said second conveyor opposite to said inspection zone of said frame device, and is adapted to carry the blank bodies conveyed by said second conveyor, a width of said carrying plate in the transverse direction being substantially equal to k times the width of each of the blank bodies so that said second conveyor conveys the blank bodies onto said carrying plate k at a time and in a manner that rearranges the k blank bodies in the transverse direction, k being a positive integer;
said stacking rods are angularly spaced apart from each other about a fourth imaginary axis extending in the up-down direction, each of said stacking rods including k stacking suction members that are arranged perpendicularly to the fourth imaginary axis, and being rotatable about the fourth imaginary axis between a plate facing position and at least one stacking position, each of said stacking suction members being operable to generate an airflow;
when one of said stacking rods is at the plate facing position, said stacking suction members of the one of said stacking rods are in a transverse arrangement, face said carrying plate, and correspond in position to the blank bodies carried by said carrying plate so as to be adapted to respectively suck the blank bodies via the airflow; and
when the one of said stacking rods is rotated from the plate facing position to the at least one stacking position, said stacking suction members of said stacking rod are adapted to release the blank bodies.

29. The molding system as claimed in claim 16, wherein: said conveying device further includes a fourth conveying unit that is disposed at said packaging zone of said frame device, that is adjacent to said second conveyor, and that includes a hollow tube and an airflow-generating subunit;
said hollow tube is configured to be U-shaped and has an inlet opening that opens downwardly toward said second conveyor and an outlet opening that opens downwardly; and
said airflow-generating subunit is operable to generate an airflow that flows into said hollow tube through said inlet opening of said hollow tube and out of said hollow tube through said outlet opening of said hollow tube, and is adapted to urge each of the blank bodies that are conveyed by said second conveyor to enter said hollow tube through said inlet opening and to exit said hollow tube through said outlet opening via the airflow so that the blank bodies are overturned after traveling through said hollow tube and are stacked one above another.

* * * * *